(12) United States Patent
Takahashi et al.

(10) Patent No.: US 12,511,943 B2
(45) Date of Patent: Dec. 30, 2025

(54) LIVENESS DETECTION APPARATUS, CONTROL METHOD, AND COMPUTER-READABLE MEDIUM

(71) Applicant: NEC Corporation, Tokyo (JP)

(72) Inventors: Koichi Takahashi, Tokyo (JP); Takamichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 344 days.

(21) Appl. No.: 18/030,197

(22) PCT Filed: Oct. 9, 2020

(86) PCT No.: PCT/JP2020/038329
§ 371 (c)(1),
(2) Date: Apr. 4, 2023

(87) PCT Pub. No.: WO2022/074833
PCT Pub. Date: Apr. 14, 2022

(65) Prior Publication Data
US 2023/0368581 A1    Nov. 16, 2023

(51) Int. Cl.
*G06V 40/40* (2022.01)
*G06T 7/70* (2017.01)
(Continued)

(52) U.S. Cl.
CPC ............... *G06V 40/45* (2022.01); *G06T 7/70* (2017.01); *G06V 10/60* (2022.01); *G06V 40/161* (2022.01);
(Continued)

(58) Field of Classification Search
CPC ...... G06V 40/45; G06V 10/60; G06V 40/161; G06V 40/167; G06V 40/172; G06V 40/67;
(Continued)

(56) References Cited

U.S. PATENT DOCUMENTS

| 6,870,529 B1 * | 3/2005 | Davis ...................... G09G 5/10 |
| | | 348/602 |
| 10,735,959 B2 | 8/2020 | Lecun et al. |

(Continued)

FOREIGN PATENT DOCUMENTS

| EP | 1770596 A1 | 4/2007 |
| JP | 2003-178306 A | 6/2003 |

(Continued)

OTHER PUBLICATIONS

JP Office Action for JP Application No. 2024-001748, mailed on Nov. 12, 2024 with English Translation.

(Continued)

*Primary Examiner* — Wassim Mahrouka

(57) ABSTRACT

A liveness detection apparatus (2000) causes a display apparatus (20) to display a plurality of screens (30). At least one of the plurality of screens (30) has a plurality of regions (32). At least two of the plurality of regions (32) include different indications. The liveness detection apparatus (2000) acquires a plurality of captured images (40). The captured image (40) is generated by capturing an image of a target object (50) with a camera (10) while the screen (30) is displayed. The liveness detection apparatus (2000) determines whether or not the target object (50) is a living body by using the plurality of captured images (40).

17 Claims, 25 Drawing Sheets

(51) Int. Cl.
    *G06V 10/60* (2022.01)
    *G06V 40/16* (2022.01)
    *G06V 40/60* (2022.01)

(52) U.S. Cl.
    CPC .......... *G06V 40/167* (2022.01); *G06V 40/172* (2022.01); *G06V 40/67* (2022.01); *G06T 2207/30201* (2013.01)

(58) Field of Classification Search
    CPC .... G06V 10/145; G06V 10/17; G06V 40/166; G06T 7/70; G06T 2207/30201
    See application file for complete search history.

(56) References Cited

U.S. PATENT DOCUMENTS

| | | | |
|---|---|---|---|
| 2007/0071321 A1* | 3/2007 | Ota | G06V 40/20 382/181 |
| 2007/0159309 A1 | 7/2007 | Ito et al. | |
| 2013/0016129 A1* | 1/2013 | Gossweiler, III | G06F 1/1694 345/173 |
| 2013/0069924 A1* | 3/2013 | Robinson | G09G 3/20 345/207 |
| 2015/0334292 A1 | 11/2015 | Tartz et al. | |
| 2017/0228586 A1 | 8/2017 | Morishita | |
| 2018/0173980 A1* | 6/2018 | Fan | G06V 40/45 |

FOREIGN PATENT DOCUMENTS

| | | |
|---|---|---|
| JP | 2008-015800 A | 1/2008 |
| JP | 2016-032193 A | 3/2016 |
| JP | 2017-518691 A | 7/2017 |
| WO | 2015/075957 | 5/2015 |
| WO | 2016/059786 A1 | 4/2016 |

OTHER PUBLICATIONS

Narishige Abe et al., "A Study for Eye Movement Authentication Technique using Sliding Windows", 2015 Symposium on Cryptography and Information Security, SCIS2015 [CD-ROM], the collection of 2015 Symposium on Cryptography and Information Security summary, Japan, Jan. 20, 2015, pp. 1-6.

International Search Report for PCT Application No. PCT/JP2020/038329, mailed on Dec. 22, 2020.

JP Office Communication for JP Application No. 2022-555262, mailed on Dec. 12, 2023 with English Translation.

Extended European Search Report for EP Application No. 20956780.9, dated on Nov. 7, 2023.

US Office Action for U.S. Appl. No. 18/030,137, mailed on May 19, 2025.

* cited by examiner

LIVENESS DETECTION APPARATUS, CONTROL METHOD, AND COMPUTER-READABLE MEDIUM

This application is a National Stage Entry of PCT/JP2020/038329 filed on Oct. 9, 2020, the contents of all of which are incorporated herein by reference, in their entirety.

TECHNICAL FIELD

The present disclosure relates to liveness detection using an image.

BACKGROUND ART

A technology for performing liveness detection using a camera has been developed. The liveness detection referred to herein means determining whether or not an object captured by a camera is a living body. For example, the liveness detection is used for prevention of impersonation using a photograph.

As a prior art document related to liveness detection using a camera, for example, there is Patent Literature 1. A system of Patent Literature 1 discloses a technology of acquiring images of a person captured in different illumination environments by controlling an illuminating lamp to change the illumination environment, and determining whether or not the captured object is a person using these images.

CITATION LIST

Patent Literature

Patent Literature 1: Japanese Unexamined Patent Application Publication No. 2003-178306

SUMMARY OF INVENTION

Technical Problem

An object of this disclosure is to improve the technology disclosed in Patent Literature 1.

Solution to Problem

A computer-readable medium of this disclosure stores a program executed by a computer. The program causes the computer to execute: a display control step of causing a display apparatus to display a first screen including a display in each of a plurality of regions and a second screen including a display different from the display of the first screen; an acquisition step of acquiring a plurality of captured images that are generated by capturing a target while each of the first screen and the second screen is displayed; and a liveness detection step of determining whether or not the target is a living body using a plurality of the captured images. The first screen includes at least two regions having different displays.

A liveness detection apparatus of this disclosure includes: a display control unit configured to cause a display apparatus to display a first screen including a display in each of a plurality of regions and a second screen including a display different from the display of the first screen; an acquisition unit configured to acquire a plurality of captured images that are generated by capturing a target while each of the first screen and the second screen is displayed; and a liveness detection unit configured to determine whether or not the target is a living body using a plurality of the captured images. The first screen includes at least two regions having different displays.

a display control unit configured to cause a display apparatus to display a first screen including an indication in each of a plurality of regions and a second screen including an indication different from the indication of the first screen;

an acquisition unit configured to acquire a plurality of captured images generated when a target is captured by a camera while each of the first screen and the second screen is displayed; and a liveness detection unit configured to determine whether or not the target is a living body using a plurality of the captured images. The first screen includes at least two regions having different indications.

A control method of this disclosure is executed by a computer. The control method includes: a display control step of causing a display apparatus to display a first screen including a display in each of a plurality of regions and a second screen including a display different from the display of the first screen; an acquisition step of acquiring a plurality of captured images that are generated by capturing a target while each of the first screen and the second screen is displayed; and a liveness detection step of determining whether or not the target is a living body using a plurality of the captured images. The first screen includes at least two regions having different displays.

EXAMPLE EMBODIMENT

Figure 1:
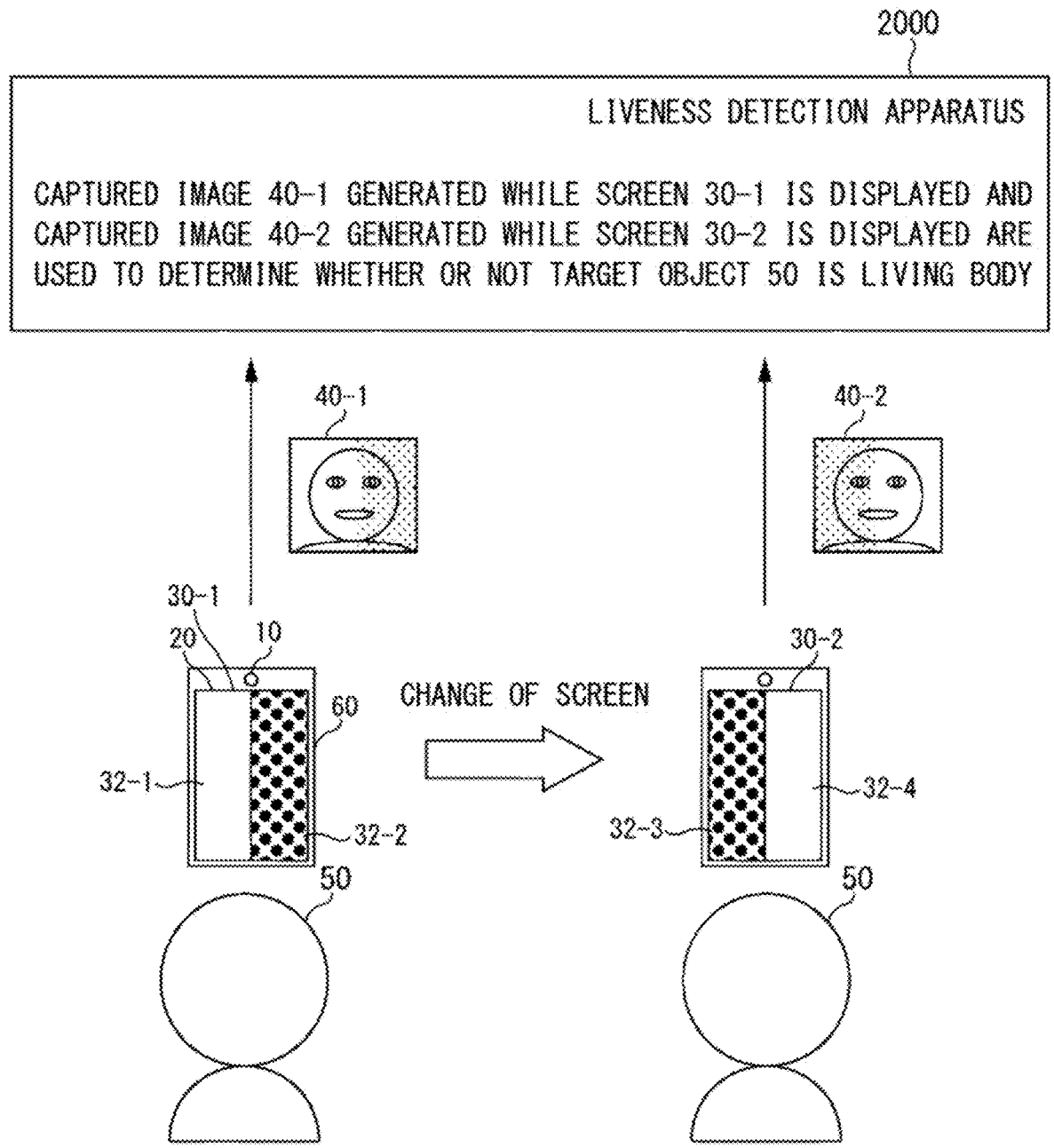
FIG. 1 is a diagram illustrating an overview of an operation of a liveness detection apparatus of a first example embodiment.

Hereinafter, example embodiments of the present disclosure will be described in detail with reference to the drawings. In the drawings, the same or corresponding elements are denoted by the same reference numerals, and redundant description will be omitted as necessary for clarity of description. Further, in the drawings, filling with a color other than white is expressed using a pattern such as a dot pattern unless otherwise specified. Further, various predetermined values (thresholds or the like) are stored in a storage apparatus in advance unless otherwise specified.

First Example Embodiment

<Overview>

FIG. 1 is a diagram illustrating an overview of an operation of a liveness detection apparatus 2000 of the first example embodiment. Here, FIG. 1 is a diagram for facilitating understanding of the overview of the liveness detection apparatus 2000, and the operation of the liveness detection apparatus 2000 is not limited to that illustrated in FIG. 1.

The liveness detection apparatus 2000 determines whether or not a target object 50 captured by a camera 10 is a living body (that is, liveness detection). For example, the liveness detection apparatus 2000 distinguishes a case where the target object 50 is a real person and a case where the target object 50 is other than a living body such as a photograph of a person (that is, a case where not a real person but a photograph of a person or the like is captured). However, the target of the liveness detection is not limited to a person, and may be another animal such as a dog or a snake, or an inanimate object such as a robot. In the following disclosure, a case where a person is the target of the liveness detection is shown as an example, but a similar method can be applied to a case where an animal other than a person or an inanimate object such as a robot is the target of the liveness detection.

To do so, the liveness detection apparatus 2000 controls output of a screen performed by a display apparatus 20. The display apparatus 20 is, for example, provided in a terminal 60 (smartphone or the like) used by the user. Specifically, the liveness detection apparatus 2000 causes the display apparatus 20 to display a plurality of screens 30 at different timings. For example, in the example of FIG. 1, after causing the display apparatus 20 to display a screen 30-1, the liveness detection apparatus 2000 changes the screen displayed on the display apparatus 20 from the screen 30-1 to a screen 30-2.

Here, at least one screen 30 has a plurality of regions 32. In the plurality of regions 32, there exist at least two regions 32 that include different displays from each other. For example, the screen 30-1 in FIG. 1 includes a region 32-1 filled with white and a region 32-2 filled with black. Note that, for convenience of illustration, black is represented by a dot pattern.

For each of the at least two screens 30, the camera 10 captures the target object 50 while the screens 30 are displayed on the display apparatus 20, and generates captured images 40 representing the result. For example, in FIG. 1, a captured image 40-1 is generated by the capturing performed while the screen 30-1 is displayed, and a captured image 40-2 is generated by the capturing performed while the screen 30-2 is displayed.

The liveness detection apparatus 2000 acquires the plurality of captured images 40 generated in this manner, and determines whether or not the target object 50 is a living body using the plurality of the captured images 40 acquired.

Example of Advantageous Effect

With the liveness detection apparatus 2000 of the present example embodiment, the capturing by the camera 10 is performed in a state where the screen 30 is displayed on the display apparatus 20. Here, in a case where the target object 50 is a paper photograph showing a face, a display device displaying a face image, or the like, the photograph or the like is irradiated with the light emitted from the display apparatus 20, and the reflected light thereof is captured by the camera 10. On the other hand, in a case where the target object 50 is a real person, the real face is irradiated with the light emitted from the display apparatus 20, and the reflected light is captured by the camera 10.

The shape of the paper, the display apparatus, or the like is substantially flat, and is greatly different from the shape of a real face. Therefore, it can be said that the characteristics of the reflected light are greatly different between the case where the light emitted from the display apparatus 20 is emitted to a paper photograph or the like and the case where the light is emitted to a real face. Then, such a difference in the characteristics of the reflected light appears in the captured image 40 obtained by capturing the reflected light with the camera 10.

With the liveness detection apparatus 2000, it is possible to determine whether or not the target object 50 is a living body based on such a difference in characteristics by analyzing the captured image 40 obtained by capturing the above-described reflected light.

Further, in the system of Patent Literature 1, light is emitted from one illuminating lamp to the target of the liveness detection. Therefore, only a limited change in illumination environment such as "illuminating the entire screen brightly" or "illuminating the entire screen darkly" can be realized. In this regard, in the liveness detection apparatus 2000 of the present example embodiment, the screen 30 includes the plurality of regions 32 having different displays. Therefore, the pattern of the light emitted from the display apparatus 20 to the target object 50 can be flexibly configured. For example, as illustrated in FIG. 1, the target object 50 can be irradiated with light of various patterns such as "left half is bright and right half is dark" or "right half is bright and left half is dark".

With the liveness detection apparatus 2000 of the present example embodiment, the light of such the various patterns is emitted to the target object 50, and the captured image 40 in which the light reflected therefrom is captured is used to determine whether or not the target object 50 is a living body. Therefore, it is possible to determine whether or not the target object 50 is a living body with higher accuracy as compared with a case where only a relatively simpler pattern of light such as "illuminating the entire screen brightly" or "illuminating the entire screen darkly" can be emitted to the target object 50.

Hereinafter, the liveness detection apparatus 2000 of the present example embodiment will be described in more detail.

Example of Functional Configuration

Figure 2:
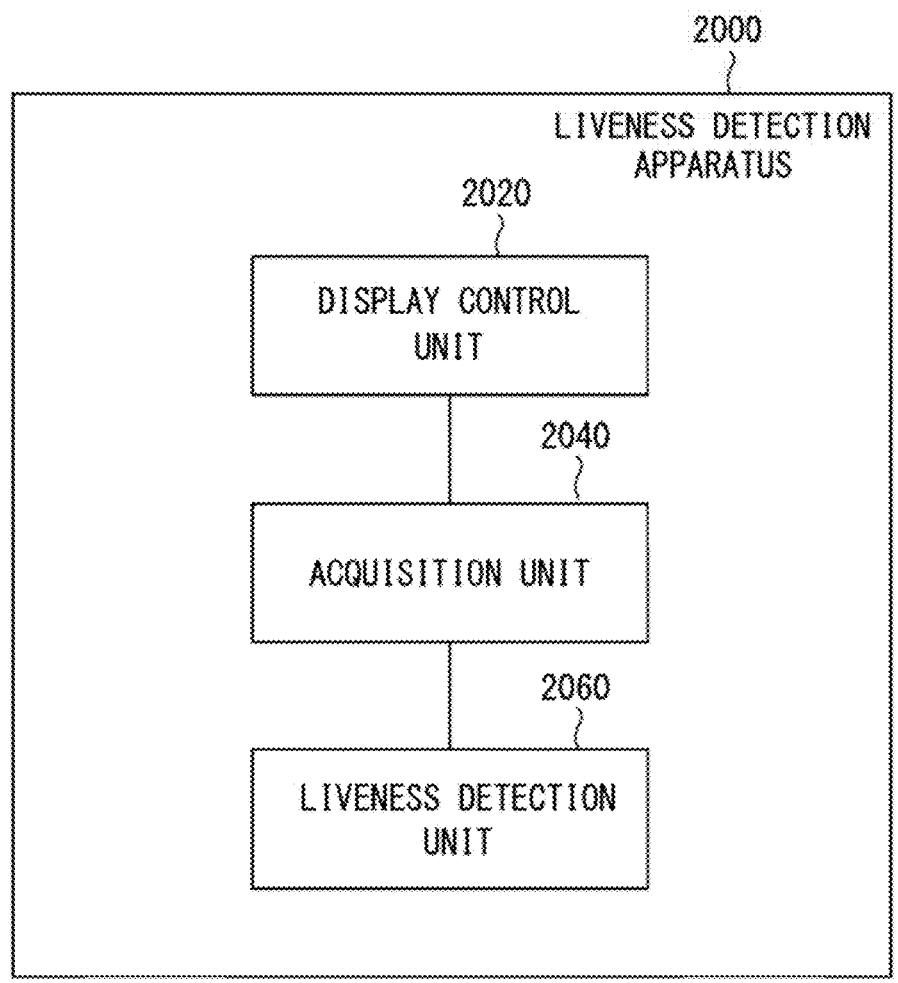
FIG. 2 is a block diagram illustrating a functional configuration of the liveness detection apparatus of the first example embodiment.

FIG. 2 is a block diagram illustrating a functional configuration of the liveness detection apparatus 2000 of the first example embodiment. The liveness detection apparatus 2000 includes a display control unit 2020, an acquisition unit 2040, and a liveness detection unit 2060. The display control unit 2020 displays the plurality of screens 30 on the display apparatus 20 at different timings. Here, at least one screen 30 has the plurality of regions 32. Further, at least two regions 32 include different displays from each other. The acquisition unit 2040 acquires a plurality of captured images 40 generated by the camera 10 while each of the plurality of screens 30 is displayed. The liveness detection unit 2060 determines whether or not the target object 50 is a living body by using the plurality of captured images 40.

Example of Hardware Configuration

Each functional configuration unit of the liveness detection apparatus 2000 may be realized by hardware (for example, a hard-wired electronic circuit or the like) that realizes each functional configuration unit, or may be realized by a combination of hardware and software (for example, a combination of an electronic circuit and a program that controls the electronic circuit or the like). Hereinafter, a case where each functional configuration unit of the liveness detection apparatus 2000 is realized by a combination of hardware and software will be further described.

Figure 3:
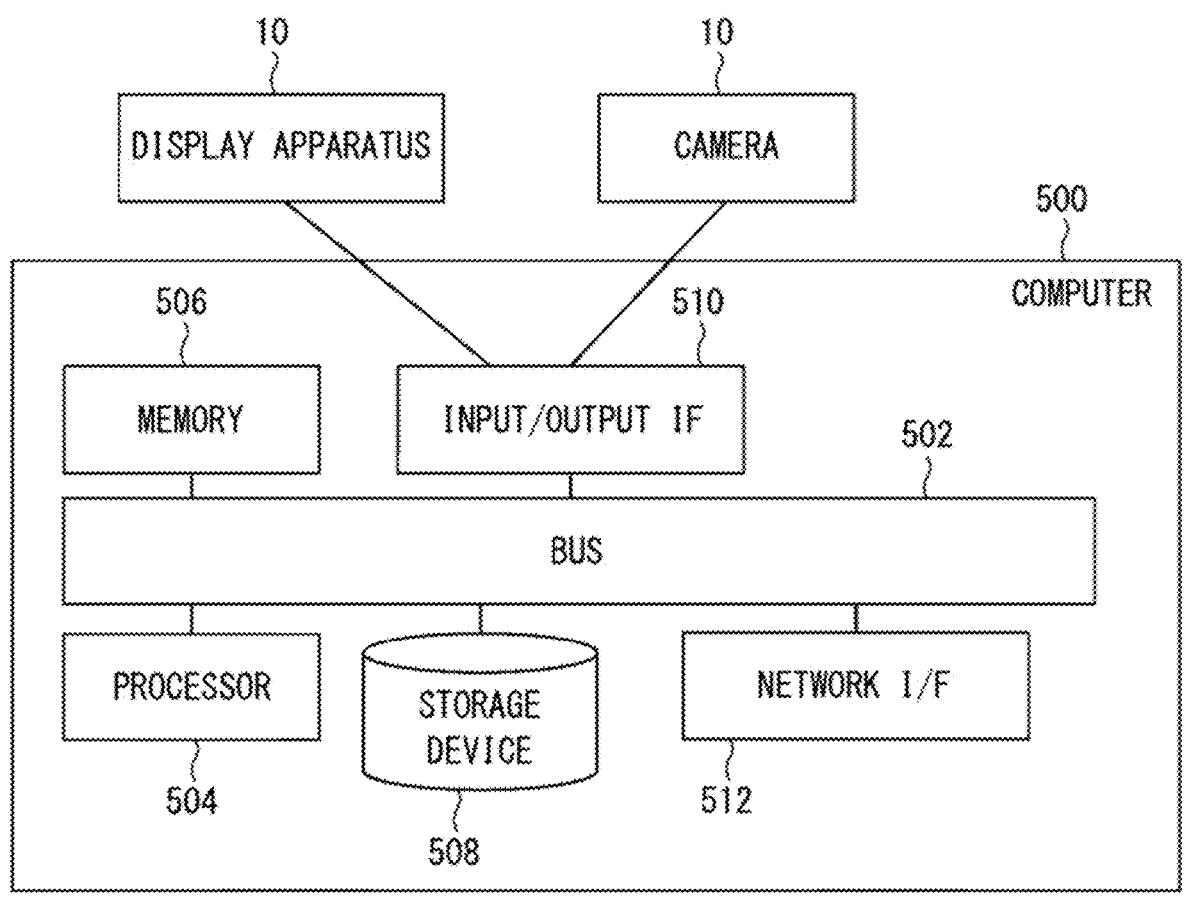
FIG. 3 is a block diagram illustrating a hardware configuration of a computer that implements the liveness detection apparatus of the first example embodiment.

FIG. 3 is a block diagram illustrating a hardware configuration of a computer 500 that implements the liveness detection apparatus 2000. The computer 500 is any computer. For example, the computer 500 is a stationary computer such as a personal computer (PC) or a server machine. In another example, the computer 500 is a mobile computer such as a smartphone, a tablet terminal, or a notebook PC. Note that, in a case where the terminal 60 is used, the liveness detection apparatus 2000 may be provided integrally with the terminal 60 or may be provided separately.

The computer 500 may be a special-purpose computer designed to realize the liveness detection apparatus 2000, or may be a general-purpose computer. For example, by installing a predetermined application on the computer 500, each function of the liveness detection apparatus 2000 is realized in the computer 500. The above-described application is configured by a program for realizing the functional configuration units of the liveness detection apparatus 2000.

The computer 500 includes a bus 502, a processor 504, a memory 506, a storage device 508, an input/output interface 510, and a network interface 512. The bus 502 is a data transmission path for the processor 504, the memory 506, the storage device 508, the input/output interface 510, and the network interface 512 to transmit and receive data to and from each other. However, the method of connecting the processor 504 and the like to each other is not limited to the bus connection.

The processor 504 is various processors such as a central processing unit (CPU), a graphics processing unit (GPU), a field-programmable gate array (FPGA), a digital signal processor (DSP), or an application specific integrated circuit (ASIC). The memory 506 is a primary storage device realized by using random access memory (RAM) or the like. The storage device 508 is a secondary storage device realized by using a hard disk, a solid state drive (SSD), a memory card, read only memory (ROM), or the like.

The input/output interface 510 is an interface for connecting the computer 500 and an input/output device. For example, the camera 10 and the display apparatus 20 are connected to the input/output interface 510.

The network interface 512 is an interface for connecting the computer 500 to a network. The network may be a local area network (LAN) or a wide area network (WAN).

The storage device 508 stores a program (program for realizing the above-described application) for realizing each functional configuration unit of the liveness detection apparatus 2000. The processor 504 realizes each functional configuration unit of the liveness detection apparatus 2000 by reading out this program in the memory 506 and executing it.

The liveness detection apparatus 2000 may be realized by one computer 500 or may be realized by a plurality of computers 500. In the latter case, the configurations of the computers 500 do not need to be the same, and can be different from each other.

<Regarding Display Apparatus 20>

The display apparatus 20 is any display apparatus capable of displaying the screen 30. For example, the display apparatus 20 is communicably connected to the terminal 60 operated by the user, and is configured to display the screen output from the terminal 60. The terminal 60 is any computer used by a user. When the target object 50 is a real person and the terminal 60 is used by the target object 50, the user of the terminal 60 is the target object 50. On the other hand, in a case where impersonation in which a photograph or the like is used as the target object 50 is about to be performed, the user of the terminal 60 is a person who causes the camera 10 to capture such a photograph or the like. The terminal 60 may be realized by a mobile computer such as a smartphone, a tablet terminal, or a laptop PC, or may be realized by a stationary computer such as a desktop PC.

In a case where the terminal 60 is realized by a mobile computer, the display apparatus 20 is a display apparatus provided in the terminal 60. On the other hand, in a case where the terminal 60 is realized by a stationary computer, the display apparatus 20 is a display apparatus communicably connected to the terminal 60 and configured to display the screen output from the terminal 60.

The liveness detection apparatus 2000 may be provided integrally with the terminal 60 or may be provided separately. In a case where the terminal 60 is provided separately from the liveness detection apparatus 2000, the hardware configuration of the computer that implements the terminal 60 is illustrated in FIG. 3, for example, similarly to the computer 500.

Further, some of the functions of the liveness detection apparatus 2000 may be provided in the terminal 60, and the other functions may be provided in a computer other than the terminal 60. For example, the display control unit 2020 and the acquisition unit 2040 are provided in the terminal 60, and the liveness detection unit 2060 is provided in a server apparatus. In this case, for example, the plurality of captured images 40 generated by the camera 10 is transmitted from the terminal 60 to the server apparatus. Then, the server apparatus performs liveness detection by analyzing the received captured images 40, and transmits information indicating the result to the terminal 60.

The display apparatus 20 is not limited to those communicably connected to the terminal 60 operated by the user. For example, the display apparatus 20 can be realized as a display apparatus that can be viewed by a person passing through a gate at an entrance of a facility where opening and closing of the gate is controlled by a computer. In this case, for example, face authentication and liveness detection using the camera 10 are performed on a person who is about to pass through the gate. Specifically, whether or not the target object 50 is registered as a person who can pass through the gate is determined by using the captured image of the target object 50 obtained from the camera 10. Furthermore, the liveness detection apparatus 2000 controls the display apparatus 20 to perform liveness detection on the target object 50. Then, when the target object 50 is registered as a person who can pass through the gate and it is determined that the target object 50 is a living body, the gate is opened by a gate control apparatus that controls opening and closing of the gate. On the other hand, when the target object 50 is not registered as a person who can pass through the gate, or when it is determined that the target object 50 is not a living body, the gate is not opened (when the gate is open, the gate control apparatus closes the gate). By performing the liveness detection, it is possible to prevent impersonation using a face photograph or the like of a registered person.

Note that, in a case where the opening and closing of the gate is controlled based on the results of the face authentication and the liveness detection, the face authentication and the liveness detection may be performed using the terminal 60 such as a smartphone used by the user. Specifically, first, when the user operates the terminal 60, the face authentication and the liveness detection by the liveness detection apparatus 2000 are performed. The gate control apparatus controls opening and closing of the gate by obtaining information indicating the results of the face authentication and the liveness detection from the terminal 60. The information indicating the results of the face authentication and the liveness detection is transmitted from the terminal 60 to the gate control apparatus, for example, by wireless communication. In another example, the terminal 60 causes the display apparatus 20 to display information (for example, a two-dimensional code or the like) indicating the results of the face authentication and the liveness detection, and causes a reader communicably connected to the gate control apparatus to read the information. The gate control apparatus controls opening and closing of the gate based on the information read by the reader.

<Regarding Camera 10>

The camera 10 is used at a position and in a pose capable of capturing the face of the target object 50 in a state where the face of the target object 50 is irradiated with light output from a display region of the display apparatus 20. For example, the camera 10 is a camera built in the vicinity of the display region of the display apparatus 20. Such a camera is called an in-camera or the like. However, the camera 10 is not limited to a camera built in the terminal 60 such as an in-camera. For example, a portable camera (such as a web camera) attached to an edge or the like of the display apparatus 20 can be used as the camera 10. In another example, the camera 10 may be installed at a position away from the display apparatus 20. For example, in the example of controlling the opening and closing of the gate according to the result of the liveness detection by the liveness detection apparatus 2000 described above, a monitoring camera or the like installed so that a person who is about to pass through the gate enters the capturing range can be used as the camera 10.

The camera 10 may be a still camera that generates a still image or a video camera that generates a video. In a case where the camera 10 is a still camera, the camera 10 generates the captured image 40 in a state where each of the plurality of screens 30 is displayed on the display apparatus 20. On the other hand, in a case where the camera 10 is a video camera, for example, the camera 10 generates video data by performing capturing in a period including a period from when the first screen 30 is displayed to when the last screen 30 is displayed. In this case, the captured image 40 is a video frame constituting the video data.

<Flow of Processing>

Figure 4:
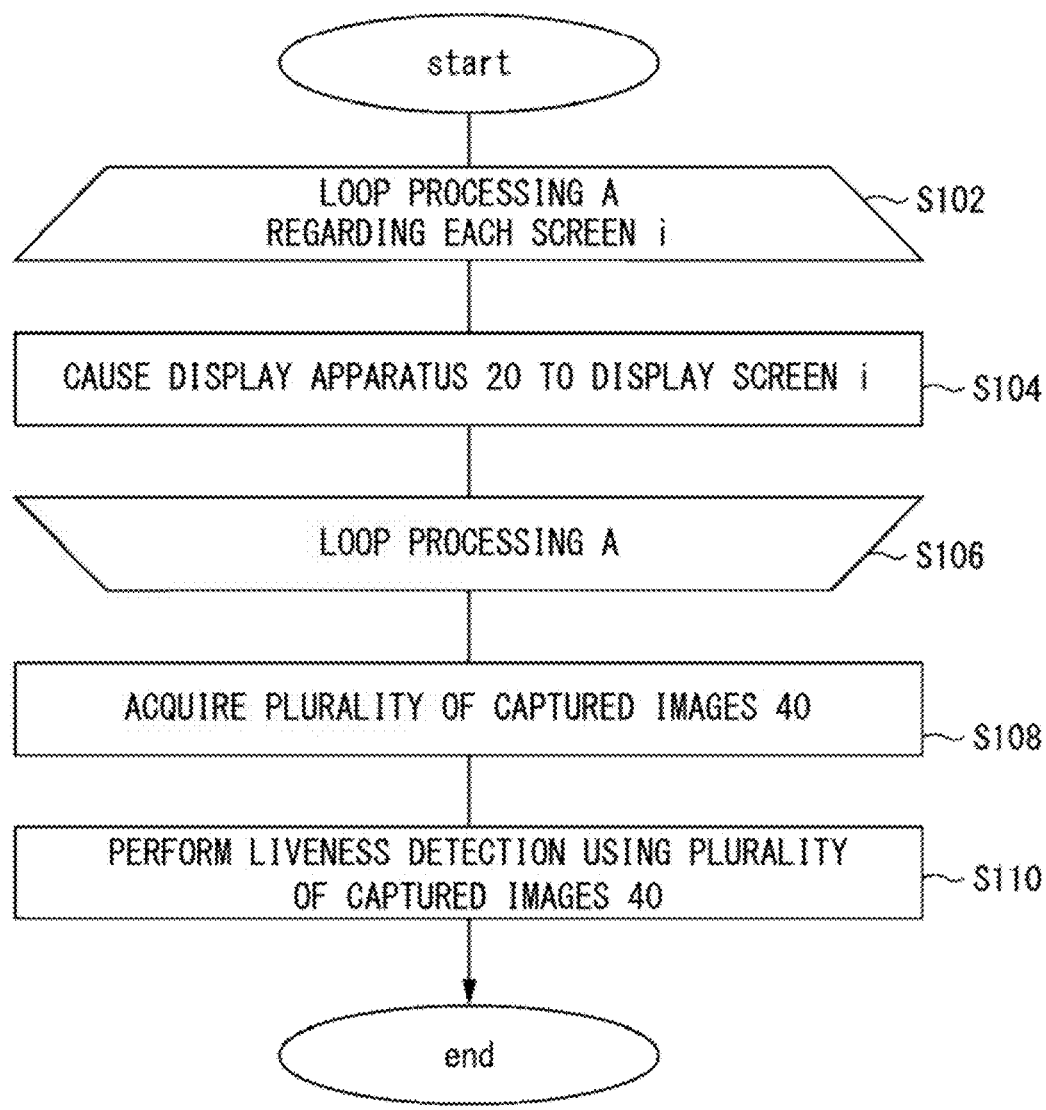
FIG. 4 is a flowchart illustrating a flow of processing executed by the liveness detection apparatus of the first example embodiment.

FIG. 4 is a flowchart illustrating a flow of processing executed by the liveness detection apparatus 2000 of the first example embodiment. S102 to S106 constitute loop processing A. The loop processing A is executed for each screen 30 to be displayed on the display apparatus 20.

In S102, the display control unit 2020 determines whether or not the loop processing A has been executed for all the screens 30. In a case where the loop processing A is executed for all the screens 30, the processing of FIG. 4 proceeds to S108. On the other hand, in a case where there are screens 30, which are not yet handled as the target of the loop processing A, the display control unit 2020 selects one of them. The screen 30 selected here is referred to as a screen i. After the screen 30 is selected, the processing in FIG. 4 proceeds to S104.

Note that the selection order of the screen 30 is arbitrary. For example, the display control unit 2020 selects the screen 30 in a predetermined order. In another example, the display control unit 2020 may select the screen 30 in a random order.

The display control unit 2020 causes the display apparatus 20 to display the screen i (S104). Since S106 is the end of the loop processing A, the processing of FIG. 4 proceeds to S102. Note that, after the screen i is displayed on the display apparatus 20 by the execution of S104, capturing is performed by the camera 10, and the captured image 40 is generated.

After the loop processing A ends, the acquisition unit 2040 acquires the plurality of captured images 40 (S108). The liveness detection unit 2060 performs liveness detection on the target object 50 by using the plurality of acquired captured images 40 (S110).

<Regarding Screen 30>

The screen 30 has the plurality of regions 32. At least one screen 30 of the screens 30 displayed on the display apparatus 20 has the plurality of regions 32. At least two regions 32 of the plurality of regions 32 include different displays from each other. The regions 32 including different displays are, for example, regions 32 having different colors or brightness from each other, or regions 32 including different characters, symbols, figures, or the like from each other. By including such two regions 32 in the screen 30, the target object 50 can be irradiated with light having uneven brightness to the target object 50 from the display apparatus 20 on which the screen 30 is displayed.

Figure 5:
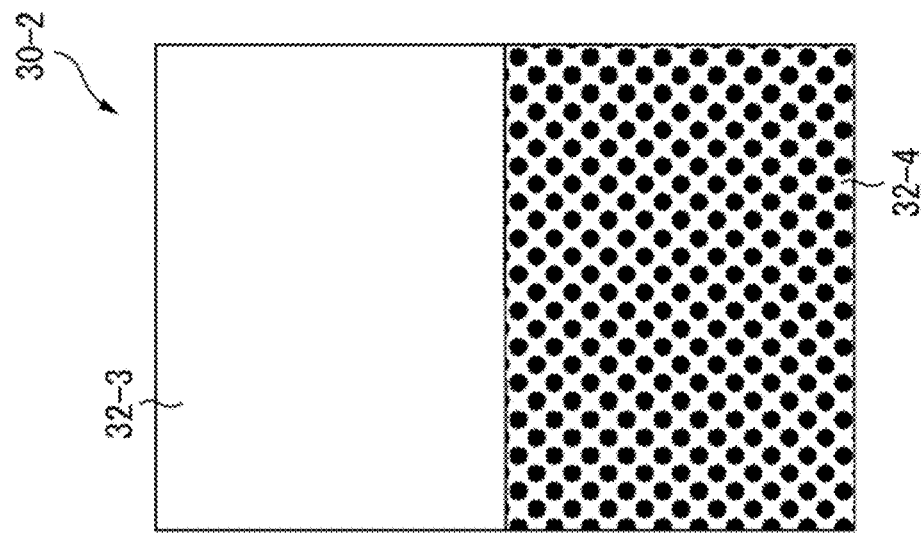
FIG. 5 is a diagram illustrating a screen including two regions.
Figure 5:
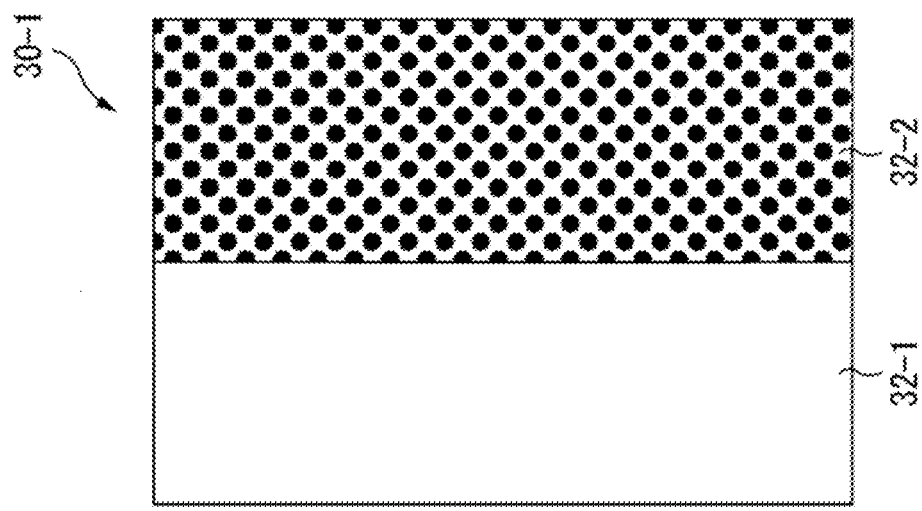

FIG. 5 is a diagram illustrating the screen 30 including two regions 32. The screen 30-1 is divided into two regions 32-1 and 32-2 by a boundary line in the vertical direction. The region 32-1 is a left half region of the screen 30-1, and the region 32-2 is a right half region of the screen 30-1. The region 32-1 and the region 32-2 are filled with different colors (all pixels have the same color) from each other. Note that the color may be set only to some pixels of the regions 32 instead of setting the color to all the pixels of the regions 32 (completely filling the region 32). For example, in the region 32, pixels for which a color is set (pixels that emit light) and pixels for which no color is set (pixels that do not emit light) may be alternately arranged.

On the other hand, the screen 30-2 is divided into two regions 32-3 and 32-4 by a boundary line in the horizontal direction. The region 32-3 is an upper half region of the screen 30-2, and the region 32-4 is a lower half region of the screen 30-2. The region 32-3 and the region 32-4 are filled with different colors from each other.

Note that as the color of the region 32, any color such as white, black, red, or blue can be used. Further, in a case where invisible light such as infrared light can be output from the display apparatus 20, invisible light may be used. For example, it is conceivable to perform processing "visible light is emitted from the left half of the display apparatus 20, and infrared light is emitted from the right half of the display apparatus 20" and then perform processing "infrared light is emitted from the left half of the display apparatus 20 and visible light is emitted from the right half of the display apparatus 20". Note that when invisible light is used, it is necessary to use a sensor capable of detecting the invisible light. For example, in a case where visible light and infrared light are used, a camera capable of capturing visible light and a camera capable of capturing infrared light are used.

In both of the screen 30-1 and the screen 30-2 in FIG. 5, the sizes of the two regions 32 are the same as each other. However, the sizes of the regions 32 may be different from each other.

In FIG. 5, the boundary line of the regions 32 is a straight line in the vertical direction or the horizontal direction. However, the boundary line of the regions 32 is not limited to a straight line in the vertical direction or the horizontal direction, and may be a diagonal line. Further, the boundary line is not limited to a straight line, and may be a curved line, a zigzag line, or the like.

Figure 6:
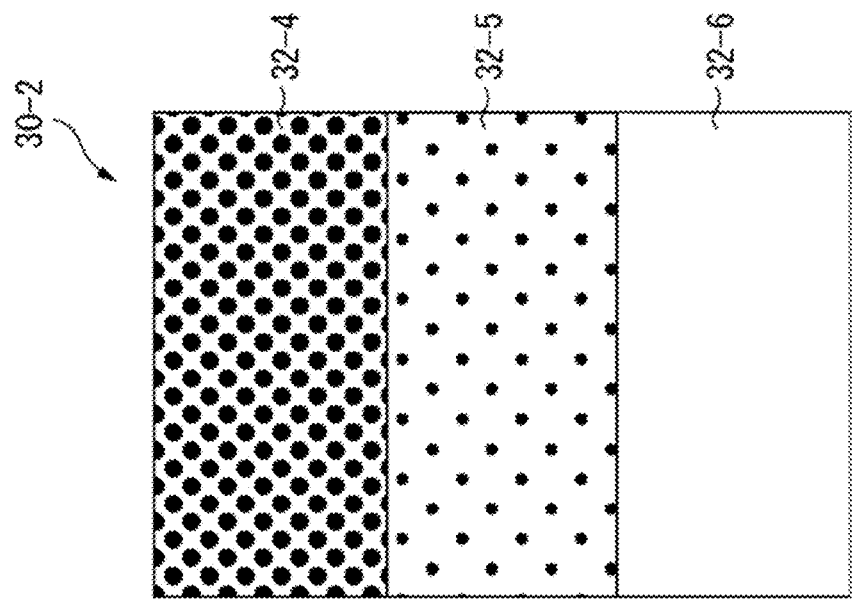
FIG. 6 is a diagram illustrating a screen including three regions.
Figure 6:
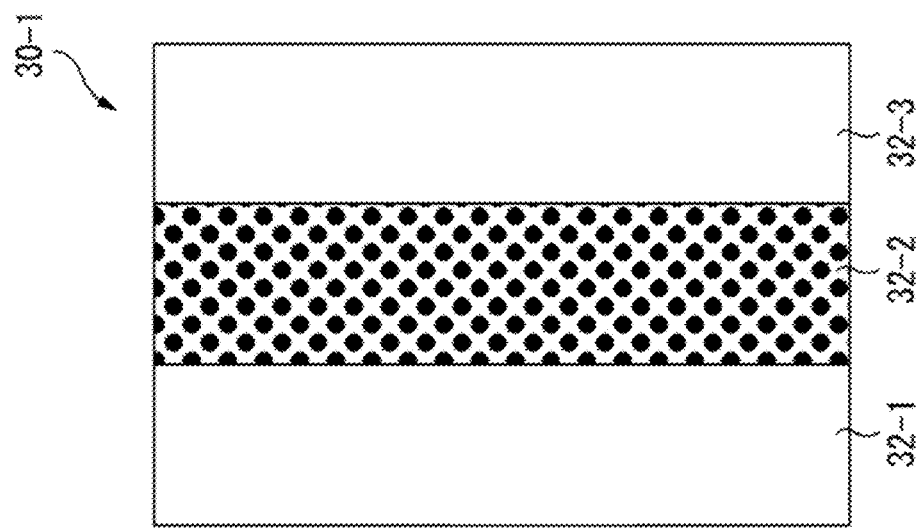

The number of regions 32 included in the screen 30 may be three or more. For example, the screen 30 is divided into n (n>=2) in the horizontal direction or the vertical direction. FIG. 6 is a diagram illustrating a screen 30 having three regions 32. In FIG. 6, the screen 30-1 is divided into three in the horizontal direction (there are three regions 32 arranged in the horizontal direction). On the other hand, the screen 30-2 is divided into three in the vertical direction (there are three regions 32 arranged in the vertical direction).

Here, in a case where the screen 30 has three or more regions 32, the displays on the plurality of regions 32 that are not adjacent to each other may be the same as each other. For example, on the screen 30-1 of FIG. 6, the region 32-1 and the region 32-3 are filled with the same color as each other, and the region 32-2 is filled with a different color therefrom. On the other hand, on the screen 30-2 of FIG. 6, the three regions 32 are filled with different colors from each other.

Figure 7:
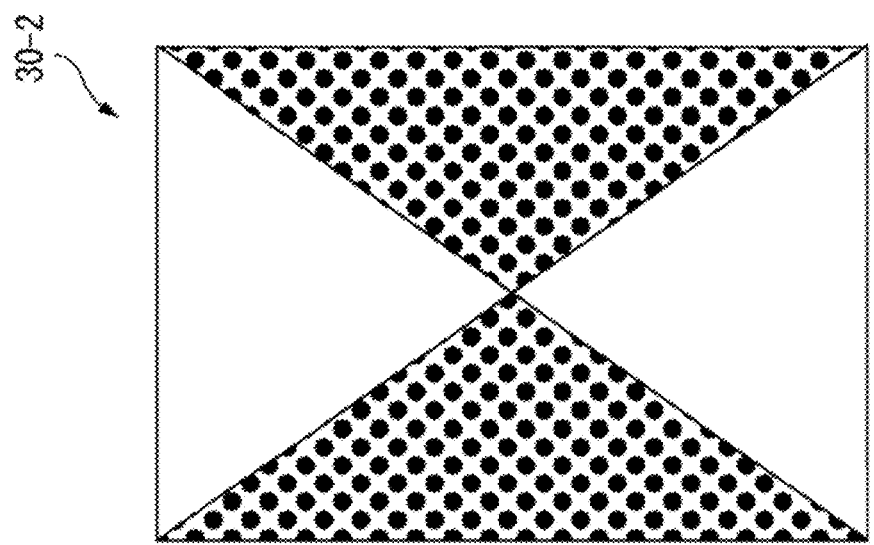
FIG. 7 is a diagram illustrating a case where a screen is divided in both a horizontal direction and a vertical direction.
Figure 7:
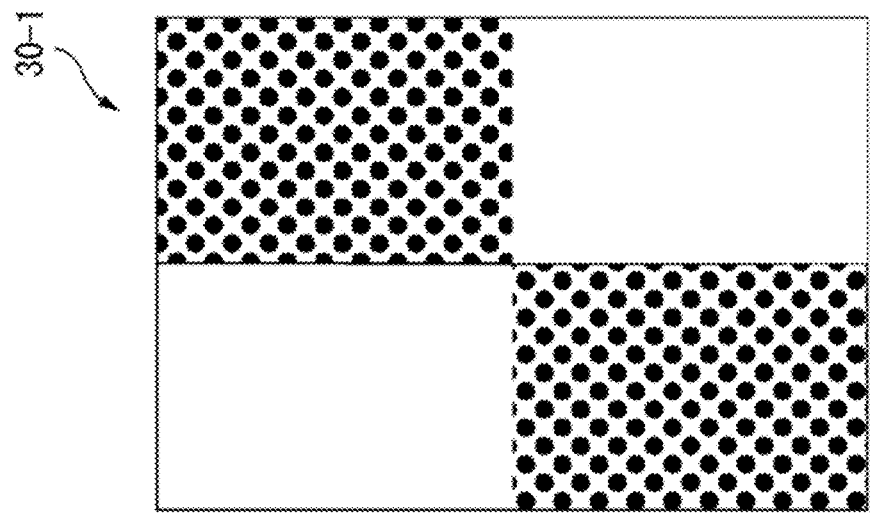

Further, the screen 30 may be divided in both the horizontal direction and the vertical direction. FIG. 7 is a diagram illustrating a case where the screen 30 is divided in both the horizontal direction and the vertical direction. In FIG. 7, the screen 30-1 is divided into four by a boundary line in the horizontal direction and a boundary line in the vertical direction. On the other hand, the screen 30-2 is divided into four by two diagonal lines.

Here, there are various methods of making the displays different on the plurality of regions 32. For example, as described above, the plurality of regions 32 is filled with different colors from each other. In a case where the regions 32 are filled with different colors from each other, it is preferable to use colors having different lightness from each other in order to make the brightness of the light emitted from the display apparatus 20 different when these regions 32 are displayed.

In another example, the regions 32 are filled with a pattern such as a lattice pattern or a dot pattern. In this case, it is preferable to make the brightness of the light emitted from the display apparatus 20 different by changing the characteristics of the pattern to be used. For example, in the lattice pattern, the brightness of the light emitted from the display apparatus 20 can be changed by changing the size of the lattice or the thickness of the line. Further, in the dot pattern, the brightness of the light emitted from the display apparatus 20 can be changed by changing the size of the dot or the interval between the dots.

In another example, the regions 32 may include a character, a symbol, a figure, or the like. Also in this case, the brightness of the light emitted from the display apparatus 20 can be changed by changing the size or interval of the characters, symbols, or figures included in the regions 32.

Further, in a case where the brightness of the display region of the display apparatus 20 can be changed for each portion, the plurality of regions 32 may display the same color with different brightness from each other. For example, in the screen 30-1 of FIG. 5, the region 32-1 is a relatively bright white region, and the region 32-2 is a relatively dark white region. In this way, even when the plurality of regions 32 is filled with the same color as each other, the brightness of the light emitted from the display apparatus 20 can be made different for each region 32. Further, the relatively dark region 32 can also be realized by a region that is not irradiated with light.

<<Relationship between Position of Camera 10 and Division Method>>

The position of the boundary line dividing the screen 30 into the plurality of regions 32 may be determined based on the relative position of the camera 10 with respect to the display apparatus 20. In a case where a person captures themself with the camera 10, there is a high possibility that the terminal 60 is held such that the position of the camera 10 is at the center of the face. Therefore, by determining the position of the boundary line of the screen 30 based on the position of the camera 10, the boundary line of the screen 30 can be positioned at the center of the target object 50. Thus, the characteristics of the light emitted to the target object 50 can be changed with the center of the target object 50 as a boundary such as "bright light is applied to the left half of the face, and dark light is applied to the right half of the face". Since the shape of the face is substantially bilaterally symmetrical, it is possible to facilitate comparison by applying light having different characteristics to the left and right of the face.

Figure 8:
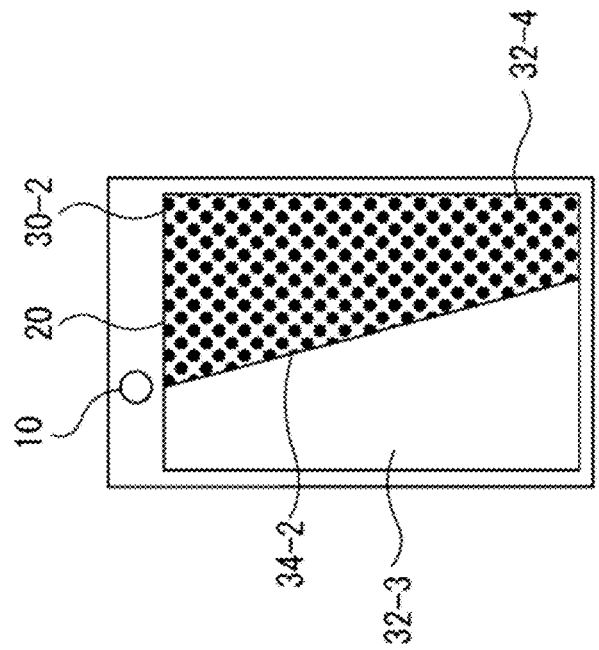
FIG. 8 is a diagram illustrating a case where a boundary line on a screen is determined based on the position of a camera.
Figure 8:
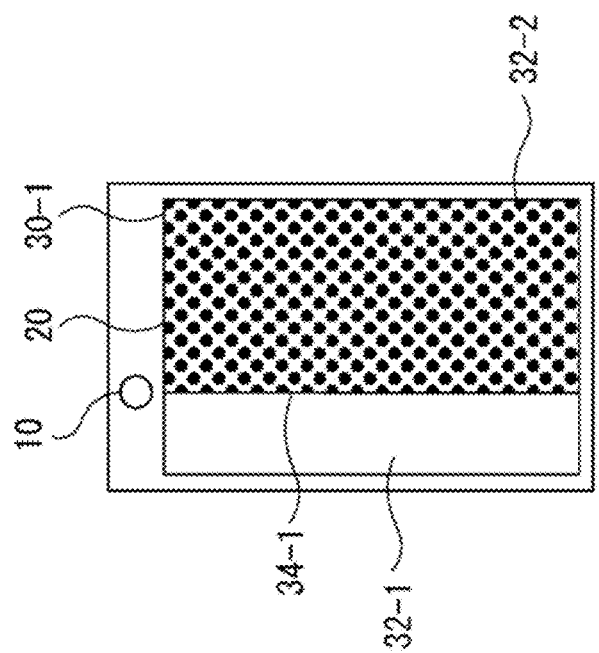

FIG. 8 is a diagram illustrating a case where a boundary line on the screen 30 is determined based on the position of the camera 10. The camera 10 in FIG. 8 is provided not at the center of the display region of the display apparatus 20 but on the left side in the horizontal direction.

In the case of the screen 30-1, a boundary 34-1 is a straight line drawn downward in the vertical direction from the camera 10. That is, the screen 30 is divided into the left and right based on the straight line drawn downward in the vertical direction from the camera 10. Here, since the camera 10 is provided on the left side, the region 32-1 is smaller than the region 32-2.

On the other hand, in the case of the screen 30-2, the screen 30 is equally divided into two while a boundary line 34 is determined with reference to the position of the camera 10. Specifically, an upper end of the boundary line 34-2 is set by an intersection of the straight line drawn downward in the vertical direction from the camera 10 and an upper side of the display region of the display apparatus 20. Then, the region 32-4 is a straight line drawn diagonally downward to the right from the above-described upper end such that the screen 30-2 is equally divided into two by the boundary line 34-2.

Note that, in a case where the screen 30 is divided in either the horizontal direction or the vertical direction, in which one the screen 30 is divided may be determined by the position of the camera 10. Specifically, in a case where the camera 10 is provided above or below the display region of the display apparatus 20, the display control unit 2020 divides the screen 30 in the horizontal direction. On the other hand, in a case where the camera 10 is provided left or right of the display region of the display apparatus 20, the display control unit 2020 divides the screen 30 in the vertical direction.

In order to determine the boundary line 34 based on the position of the camera 10, it is necessary for the liveness detection apparatus 2000 to know the positional relationship between the camera 10 and the display region of the display apparatus 20. For example, the position of one end of the boundary line 34 determined as described above is set in the liveness detection apparatus 2000 in advance. In another example, the position of the one end of the boundary line 34 may be set by the user of the terminal 60. For example, the liveness detection apparatus 2000 causes the user of the terminal 60 to specify a position on the display region of the display apparatus 20. Then, the liveness detection apparatus 2000 uses an x coordinate of the specified position as an x coordinate of the upper end of the boundary line 34.

Note that not only one end of the boundary line 34 but also the boundary line 34 itself may be set by the user of the terminal 60. For example, the user is caused to draw a line on the display apparatus 20, and the line is used as the boundary line 34. Note that, in a case where it is desired to determine the boundary line 34 based on the user's face, for example, an image (captured image 40) of the user's face captured by the camera 10 is displayed on the display apparatus 20. Then, for example, by causing the display apparatus 20 to display a guide message such as "draw a line so as to pass through the center of your face", the boundary line 34 based on the user's face is set.

Further, the liveness detection apparatus 2000 may detect a face from the captured image 40, and automatically determine the boundary line 34 based on the position of the face on the captured image 40 (for example, a straight line in the vertical direction passing through the center of the face).

<Control of Display on Screen 30: S102 to S106>

The display control unit 2020 causes the display apparatus 20 to display the plurality of screens 30 at different timings (S102 to S106). Various screens 30 described above can be used as the plurality of screens 30. Note that two or more types of screens 30 are displayed on the display apparatus 20, and at least one of them has a plurality of different regions 32. The screen 30 displayed on the display apparatus 20 may include a screen 30 that is not divided into the plurality of regions 32.

Figure 9:
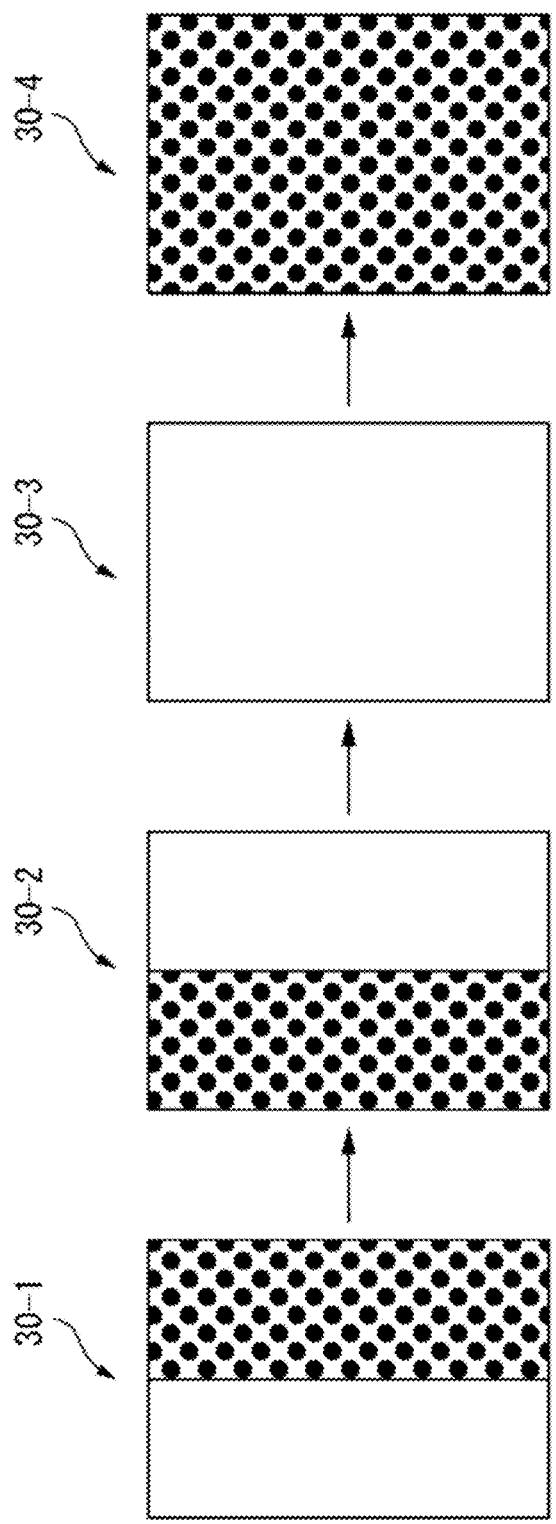
FIG. 9 is a first diagram illustrating a plurality of screens displayed on a display apparatus by a display control unit.

FIG. 9 is a first diagram illustrating a plurality of screens 30 displayed on the display apparatus 20 by the display control unit 2020. In the example of FIG. 9, the screens 30 are displayed in the order of a screen 30-1, a screen 30-2, a screen 30-3, and a screen 30-4.

The left half of the screen 30-1 is filled with white, and the right half is filled with black. The left half of the screen 30-2 is filled with black, and the right half is filled with white. The screen 30-3 is entirely filled with white. The screen 30-4 is entirely filled with black.

Figure 10:
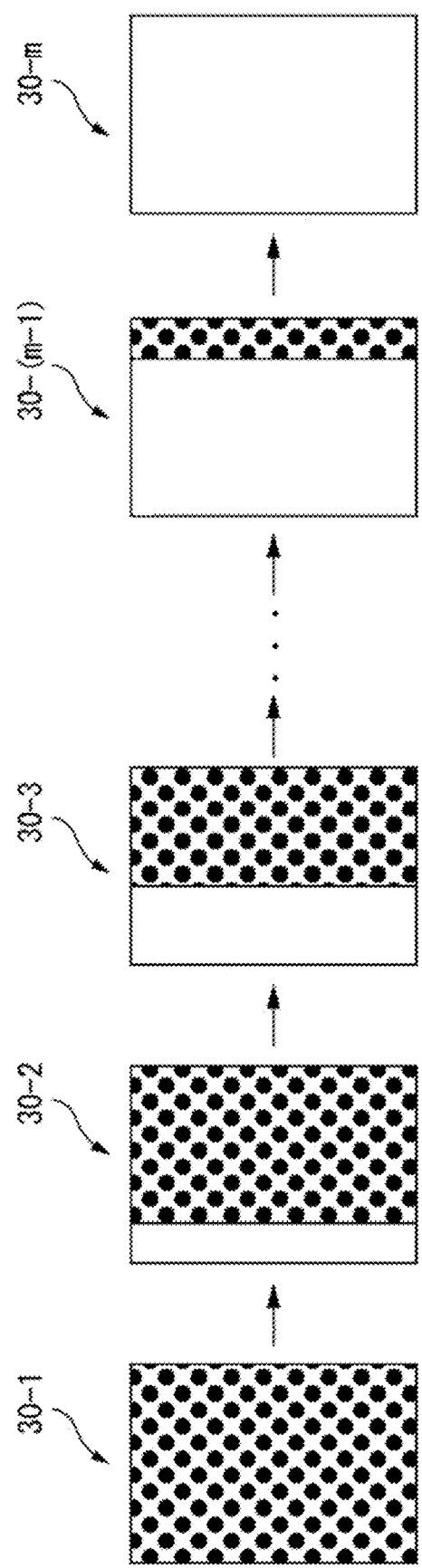
FIG. 10 is a second diagram illustrating a plurality of screens displayed on the display apparatus by the display control unit.

FIG. 10 is a second diagram illustrating a plurality of screens 30 displayed on the display apparatus 20 by the display control unit 2020. In FIG. 10, m screens 30 are displayed in order. These m screens 30 are generated by gradually moving the boundary line between the left region 32 filled with white and the right region 32 filled with black to the right.

Note that when the boundary line is moved as illustrated in FIG. 10, a plurality of patterns of screens 30 may be displayed with respect to one position of the boundary line. For example, in the example of FIG. 10, it is assumed that the display on the region 32 is changed every 1 second while moving the boundary line every 3 seconds. In this case, three patterns of screens 30 are displayed in a state where the position of the boundary line is fixed. For example, by displaying three types of screens 30 including a screen 30 in which the left region 32 is white, a screen 30 in which the left region 32 is relatively light gray, and a screen 30 in which the left region 32 is relatively dark gray, it is possible to display a plurality of patterns of screens 30 in a state where the boundary line is fixed. However, the region 32 whose display is changed in a state where the boundary line is fixed is not limited to only one region 32, and the display on each of the plurality of regions 32 may be changed.

Note that the time during which each screen 30 is displayed on the display apparatus 20 may be the same length as each other or may be different lengths from each other.

The camera 10 needs to be able to capture images of two or more screens 30 at the timing when the screens 30 are displayed on the display apparatus 20. Therefore, for example, the display control unit 2020 controls capturing by the camera 10. Specifically, the liveness detection apparatus 2000 repeats processing "the display apparatus 20 is caused to display the screen 30, and then the camera 10 is caused to capture an image" while changing the screen 30. Thus, for each screen 30, the captured image 40 is obtained for the state where the screen 30 is displayed on the display apparatus 20.

However, the timing of capturing by the camera 10 may not be controlled by the display control unit 2020. For example, the camera is configured to repeatedly perform capturing. By switching the screen 30 displayed on the display apparatus 20 while the camera 10 repeatedly performs capturing, it is possible to obtain the captured image 40 for the state where each screen 30 is displayed. In this case, for example, the length of time during which one screen 30 is displayed on the display apparatus 20 is preferably set to be longer than the capturing cycle of the camera 10. In this way, for each of all the screens 30, one or more captured images 40 that are generated while that screen 30 is displayed on the display apparatus 20 can be obtained. However, the length of the time during which the screen 30 is displayed on the display apparatus 20 is not necessarily set to be longer than the capturing cycle of the camera 10.

Note that, in a case where three or more screens 30 are displayed on the display apparatus 20, the captured image 40 is not necessarily generated for all the screens 30. For example, in the example of FIG. 10, it is assumed that the camera 10 is a video camera, and the capturing cycle of the camera 10 is longer than the movement cycle of the boundary line. In this case, there is a possibility that any one or more screens 30 among the m screens 30 are not captured by the camera 10 while the screens 30 are displayed. However, as long as two or more captured images 40 can be acquired, the liveness detection by the liveness detection unit 2060 can be realized.

<Acquisition of Captured Image 40: S108>

The acquisition unit 2040 acquires the plurality of captured images 40 generated by the camera 10 (S108). Here, various methods can be used as a method of acquiring the image generated by the camera. For example, the acquisition unit 2040 acquires the captured image 40 by accessing a storage device in which the captured image 40 is stored. Here, the storage device may be provided either inside or outside the camera 10. In another example, the acquisition unit 2040 may acquire the captured image 40 by receiving the captured image 40 transmitted from the camera 10 to the liveness detection apparatus 2000.

<Execution of Liveness detection: S110>

The liveness detection unit 2060 performs the liveness detection by using the plurality of acquired captured images 40. Specifically, the liveness detection unit 2060 determines whether or not the target object 50 captured by the camera 10 is a living body.

As described above, the shape of the target object 50 is greatly different from each other, and such a difference in shape appears in the captured image 40 as a difference in characteristics of the reflected light. Hence, for example, the liveness detection unit 2060 determines whether or not the target object 50 is a living body based on the characteristics of the distribution of the color or brightness of the target object 50 on the captured image 40.

There are various specific methods for realizing the liveness detection by the liveness detection unit 2060. For example, the liveness detection is realized using a trained identification model. In response to the input of the plurality of captured images 40, the identification model outputs data indicating a determination result as to whether or not the object captured by the camera 10 is a living body. The data indicating the determination result is, for example, a label indicating 1 in a case where the object captured by the camera 10 is a living body and indicating 0 in a case where the object captured by the camera 10 is not a living body. Such an identification model can be realized by, for example, a neural network such as a convolutional neural network (CNN). However, the type of the identification model is not limited to the neural network. According to the method of performing the liveness detection using the trained identification model, an algorithm for determining whether or not the target object 50 is a living body can be easily constructed in a data-driven manner.

The training of the identification model can be realized using training data configured by a combination of "a plurality of captured images 40 and a ground-truth label". For example, it is assumed that the display control unit 2020 causes the display apparatus 20 to display three types of screens 30 from the screen 30 of a first pattern to the screen 30 of a third pattern. In this case, the captured image 40 of the first pattern to the captured image 40 of the third pattern are obtained corresponding to the screen 30 of the first pattern to the screen 30 of the third pattern. Here, the captured image 40 of an n-th pattern (n is an integer being larger than or equal to 1 and being less than or equal to 3) is the captured image 40 generated by the camera 10 while the screen 30 of the n-th pattern is displayed on the display apparatus 20. In a case where the captured images 40 of the three patterns are obtained in this manner, training data configured by a combination of "the captured image 40 of the first pattern, the captured image 40 of the second pattern, the captured image 40 of the third pattern, and a ground-truth label" is used for training of the identification model.

The training of the identification model is preferably performed using both the training data of a positive example and the training data of a negative example. The training data of the positive example indicates a plurality of captured images 40 obtained in a case where the living body is captured by the camera 10 and a ground-truth label (for example, 1) indicating that the living body is captured by the camera 10. On the other hand, the training data of the negative example indicates a plurality of captured images 40 obtained in a case where those other than a living body is captured by the camera 10 and a ground-truth label (for example, 0) indicating that those other than a living body is captured by the camera 10. By using both the training data of the positive example and the training data of the negative example, it is possible to learn a difference between the captured image 40 obtained in a case where a living body is captured and the captured image 40 obtained in a case where those other than a living body is captured.

<Output of Result>

The liveness detection apparatus 2000 outputs information indicating a result of the liveness detection (hereinafter, detection result information). The detection result information indicates a determination result as to whether or not the target object 50 is a living body. The detection result information is preferably displayed on a display apparatus (for example, the display apparatus 20) viewable by the user of the terminal 60. However, the detection result information may be output to those other than the display apparatus of the terminal 60.

<Other Processing>

The target object 50 is irradiated with ambient light (sunlight, illumination light, or the like) around the display apparatus 20 in addition to the light emitted from the display apparatus 20. Then, in a case where the ambient light is extremely stronger than the light emitted from the display apparatus 20, the ambient light becomes dominant, and therefore, even when the intensity of the light emitted from the display apparatus 20 is changed, the change hardly appears in the captured image 40. Therefore, it is preferable that the liveness detection using the liveness detection apparatus 2000 is performed in a place where the ambient light is not too strong.

Hence, for example, the liveness detection apparatus 2000 may determine the intensity of the ambient light before the display control unit 2020 controls the display apparatus 20, and may start a series of processing for the liveness detection (S102 to S110 in FIG. 4) only in a case where it is determined that the ambient light is equal to or less than a threshold. In this way, it is possible to perform the liveness detection processing when the intensity of the ambient light is appropriate.

The intensity of the ambient light is determined using, for example, an illuminance sensor. The illuminance sensor may be built in the display apparatus 20 or the terminal 60 in advance, or may be separately prepared. In a case where the ambient light is larger than the threshold, for example, the liveness detection apparatus 2000 causes the display apparatus 20 to display a message that recommend moving to a slightly darker place (a place where the ambient light is weaker than the current state). In this way, in a case where the terminal 60 is not used in an appropriate environment, it is possible to notify the user of that fact so that the terminal 60 is used in an appropriate environment.

Note that the method of determining whether or not the intensity of the ambient light is appropriate is not limited to the method of measuring the intensity of the ambient light with a sensor. For example, the liveness detection apparatus 2000 determines whether or not the intensity of the ambient light is appropriate based on the height of the luminance of the captured image 40. The captured image 40 may be generated while the screen 30 is displayed on display apparatus 20, or may be generated while the screen 30 is not displayed on the display apparatus 20. For example, in a case where a statistical value (for example, an average value) of luminance of all or some pixels included in the captured image 40 is equal to or less than a threshold, the liveness detection apparatus 2000 determines that the intensity of the ambient light is appropriate. On the other hand, in a case where the statistical value is larger than the threshold, the liveness detection apparatus 2000 determines that the intensity of the ambient light is not appropriate.

In another example, the liveness detection apparatus 2000 may compare the captured image 40 generated by the camera 10 while the relatively bright screen 30 (for example, the screen 30 that is entirely white) is displayed on the display apparatus 20 with the captured image 40 generated by the camera 10 while the relatively dark screen 30 (for example, the screen 30 that is entirely black) is displayed on the display apparatus 20, and determine whether there is a sufficient difference in luminance (for example, the difference in luminance is equal to or greater than a threshold). The difference in luminance can be expressed by, for example, a difference between a statistical value (for example, an average value) of luminance of all pixels included in the former captured image 40 and a statistical value of luminance of all pixels included in the latter captured image 40.

However, in the calculation of the statistical value of the luminance, the luminance of the region including the target object 50 may be prioritized over the luminance of the other regions. For example, the liveness detection apparatus 2000 detects a region including the target object 50 from the captured image 40, and calculates the statistical value of the luminance using only the luminance of the region. In another example, the liveness detection apparatus 2000 may calculate a weighted average of the luminance of the entire image after giving a larger weight to the luminance of the region including the target object 50 than that to the other regions.

When it is determined that there is not a sufficient difference in luminance, it is considered that the ambient light is too strong. Hence, in a case where it is determined that there is no sufficient difference in luminance, for example, the liveness detection apparatus 2000 does not determine whether or not the target object 50 is a living body, and causes the display apparatus 20 to display a message that recommend re-trying the liveness detection after moving to a slightly darker place. The method of determining whether or not the ambient light is too strong by comparing the captured images 40 in this manner has an advantage that hardware (such as an illuminance sensor) for determining the intensity of the ambient light is unnecessary.

The display control unit 2020 may change the screen 30 to be displayed on the display apparatus 20 according to the intensity of the ambient light. For example, it is preferable to increase the contrast of the screen 30 as the ambient light is stronger. In this way, the probability that the ambient light becomes dominant can be lowered. Further, in this way, since the contrast of the screen 30 becomes lower as the ambient light becomes weaker, the power consumption of the display apparatus 20 can be reduced. The contrast of the screen 30 may be realized by any one or both of two measures of "making the relatively bright region 32 brighter" and "making the relatively dark region 32 darker".

For example, the plurality of screens 30 to be displayed on the display apparatus 20 is determined in advance for each level (hereinafter, ambient light level) of the intensity of the ambient light. A higher ambient light level is associated with a higher contrast screen 30. The display control unit 2020 determines the ambient light level to which the current intensity of the ambient light corresponds, and uses the screen 30 associated with the determined ambient light level.

In another example, the display control unit 2020 may generate the screen 30 according to the intensity of the ambient light by changing (correcting) the color of the pixel included in one or a plurality of regions 32 included in the screen 30 according to the intensity of the ambient light. For example, a correction coefficient $\alpha$, whose value increases as the ambient light is stronger, is prepared. The value range of the correction coefficient $\alpha$ is, for example, $0<\alpha\leq 1$. By multiplying this correction coefficient by the lightness of the color included in the region 32, the region 32 can be brightened as the ambient light is stronger.

The liveness detection apparatus 2000 may acquire the captured image 40 and perform face detection processing before causing the display apparatus 20 to display the screen 30, and may start a series of processing for the liveness detection in response to detection of a face from the captured image 40. This is because the liveness detection cannot be performed in a case where the face is not detected from the captured image 40. For example, after causing the display apparatus 20 to display a message that prompts to capture the face, the liveness detection apparatus 2000 repeatedly acquires the captured image 40 and performs the face detection processing. Then, when a face is detected from the captured image 40, a series of processing for the liveness detection is started. On the other hand, in a case where the face is not detected from the captured image 40 for a certain period of time, the liveness detection apparatus 2000 causes the display apparatus 20 to display a message that prompts to capture the face.

Furthermore, in a case where a face is detected from the captured image 40, the liveness detection apparatus 2000 may determine whether or not the size of the face is sufficiently large. For example, the liveness detection apparatus 2000 starts a series of processing for the liveness detection only when the size of the face is sufficiently large. On the other hand, in a case where the size of the face is not sufficiently large, the liveness detection apparatus 2000 causes the display apparatus 20 to display a message that prompts to capture a larger image of the face.

Whether or not the size of the face is sufficiently large is determined, for example, by comparing the area of the region of the face of the target object 50 in the captured image 40 with a threshold. In another example, whether or not the size of the face is sufficiently large may be determined not by the size of the face itself but by comparing the distance between the left eye and the right eye with a threshold. In this case, the liveness detection apparatus 2000 detects the left eye and the right eye of the target object 50 from the captured image 40 and calculates the distance therebetween. Then, the liveness detection apparatus 2000 determines whether or not the calculated distance is equal to or less than the threshold. In a case where the distance between the eyes is equal to or less than the threshold, the liveness detection apparatus 2000 determines that the size of the face is sufficiently large. On the other hand, in a case where the distance between the eyes is larger than the threshold, the liveness detection apparatus 2000 determines that the size of the face is not sufficiently large.

In another example, the liveness detection apparatus 2000 may determine whether the size of the face is sufficiently large based on the distance between the display apparatus 20 and the target object 50. For example, in a case where the distance between the display apparatus 20 and the target object 50 is equal to or less than a threshold, the liveness detection apparatus 2000 determines that the size of the face is sufficiently large. On the other hand, in a case where the distance between the display apparatus 20 and the target object 50 is larger than the threshold, the liveness detection apparatus 2000 determines that the size of the face is not sufficient. Note that as a method for calculating the distance between the display apparatus 20 and the target object 50, various methods such as a method using a depth sensor can be used. Further, instead of the distance between the display apparatus 20 and the target object 50, the distance between the camera 10 and the target object 50 may be used. In this case, the distance between the camera 10 and the target object 50 can be determined by using a stereo camera or a camera with a depth sensor as the camera 10.

Figure 11:
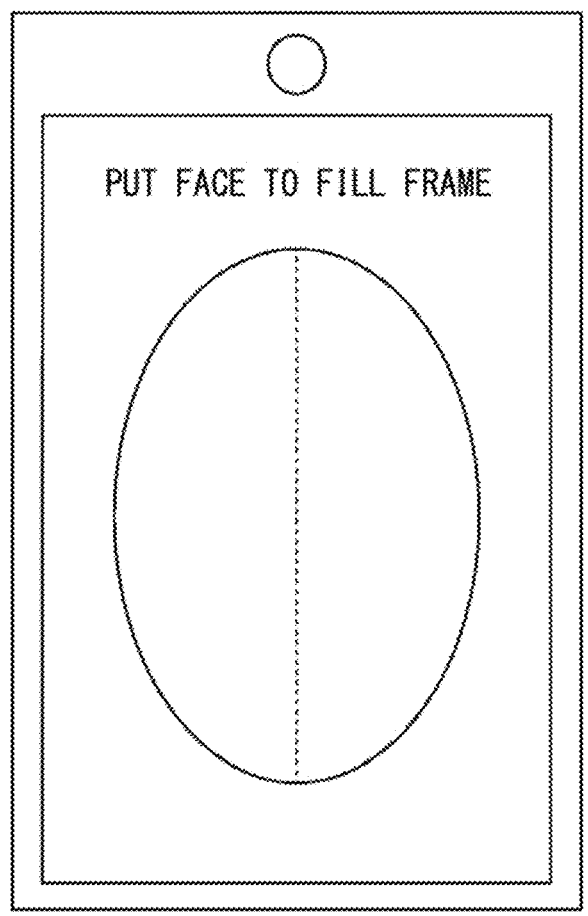
FIG. 11 is a diagram illustrating a guide indicating an appropriate size of a face.

Note that the liveness detection apparatus 2000 may cause the display apparatus 20 to display a guide indicating an appropriate size of the face so that the user can easily capture the face with an appropriate size. FIG. 11 is a diagram illustrating a guide indicating an appropriate size of a face. An oval frame represents a position where the face should be arranged. Further, a dotted line represents a position where a center line (line passing through the center) of the face should be arranged. By displaying such a guide, the user can more easily perform the capturing.

The liveness detection apparatus 2000 may detect that the center line of the user's face in the captured image 40 overlaps the center line (dotted line in FIG. 11) of the face indicated by the guide described above, and may start a series of processing of the liveness detection in response to the detection. As a result, the liveness detection is performed at the timing when the face takes an appropriate posture, and thus, the accuracy of the liveness detection is improved. Note that existing techniques can be used as techniques for determining the center line of the face by image analysis.

In another example, the liveness detection apparatus 2000 may detect blinking of the target object 50 using the captured image 40 and start a series of processing of the liveness detection in response to the detection. Note that existing techniques can be used as techniques for detecting blinking from time-series images.

Second Example Embodiment

A liveness detection apparatus 2000 of the second example embodiment performs liveness detection on a target object 50 similarly to the liveness detection apparatus 2000 of the first example embodiment. However, the liveness detection apparatus 2000 of the second example embodiment realizes liveness detection by a method different from that of the liveness detection apparatus 2000 of the first example embodiment.

Figure 12:
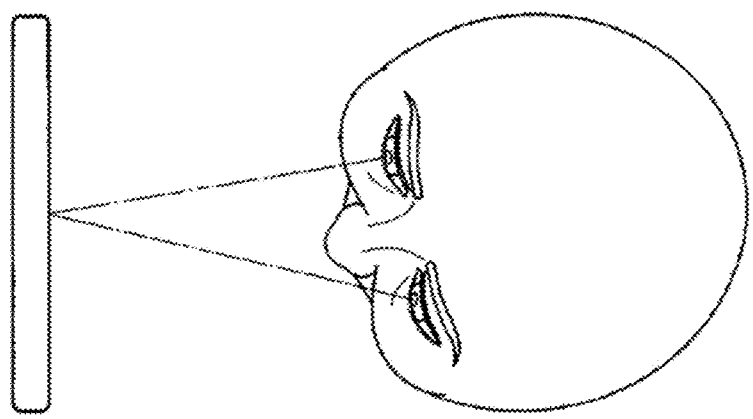
FIG. 12 is a diagram illustrating a state where the orientation of a face is moved left and right in a state where the direction of the line of sight is fixed.
Figure 12:
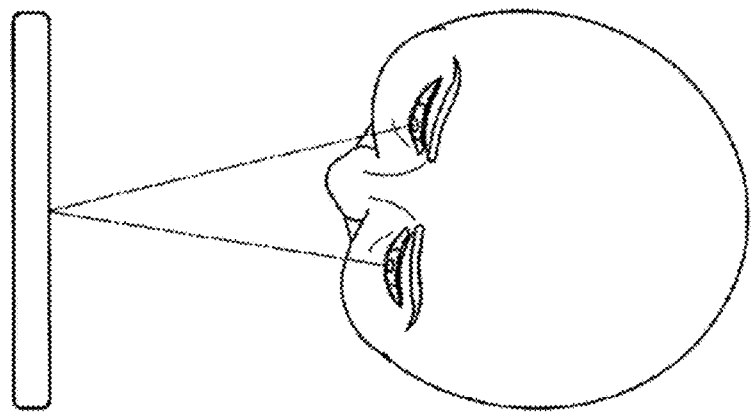
Figure 12:
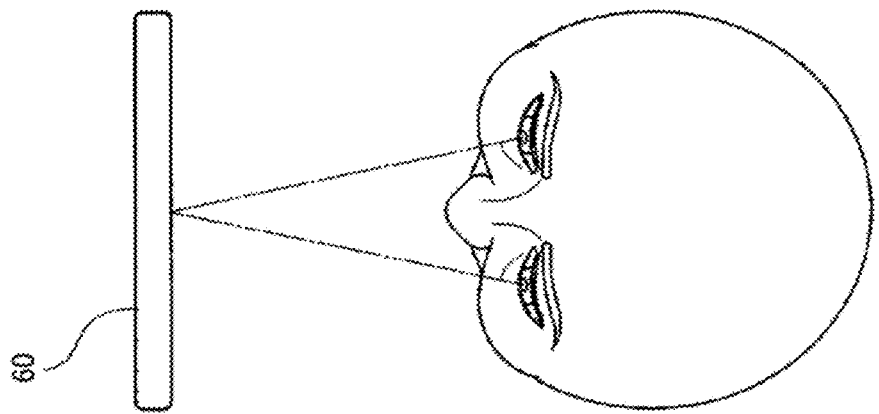

As a premise, in the present example embodiment, a camera 10 captures an image of a scene where a person of the target of the liveness detection (target object 50) moves the orientation of the face left and right in a state where the direction of the line of sight is fixed. FIG. 12 is a diagram illustrating a state where the orientation of the face is moved left and right in a state where the direction of the line of sight is fixed (in a state where the same place is continuously viewed). The line of sight is fixed at one point on a terminal 60.

Here, in a case where the face captured by the camera 10 is a real face, a target person can move the eyes independently of the movement of the face, so that the face direction can be changed with the line-of-sight direction being fixed. Then, in a case where a motion of changing the face direction over time with the line-of-sight direction being fixed is performed, the difference between the face direction and the line-of-sight direction changes over time. For example, in a case where both the face and the line of sight face the front, the difference between the face direction and the line-of-sight direction is small. On the other hand, in a case where the face faces either the left or the right while the line of sight facing the front, the difference between the face direction and the line-of-sight direction is large.

On the other hand, suppose that the target person wears an attachment (a so-called 3D mask or the like) on which the face of another person is drawn for impersonation. In this case, since the eyes are drawn on a mask or the like, the eyes cannot be moved independently of the movement of the face. That is, the direction of the line of sight changes together with the face direction. Therefore, even if a motion of changing the face direction over time with the line-of-sight direction being fixed is performed, in practice, the difference between the face direction and the line-of-sight direction does not change over time or the amount of change is smaller.

Figure 13:
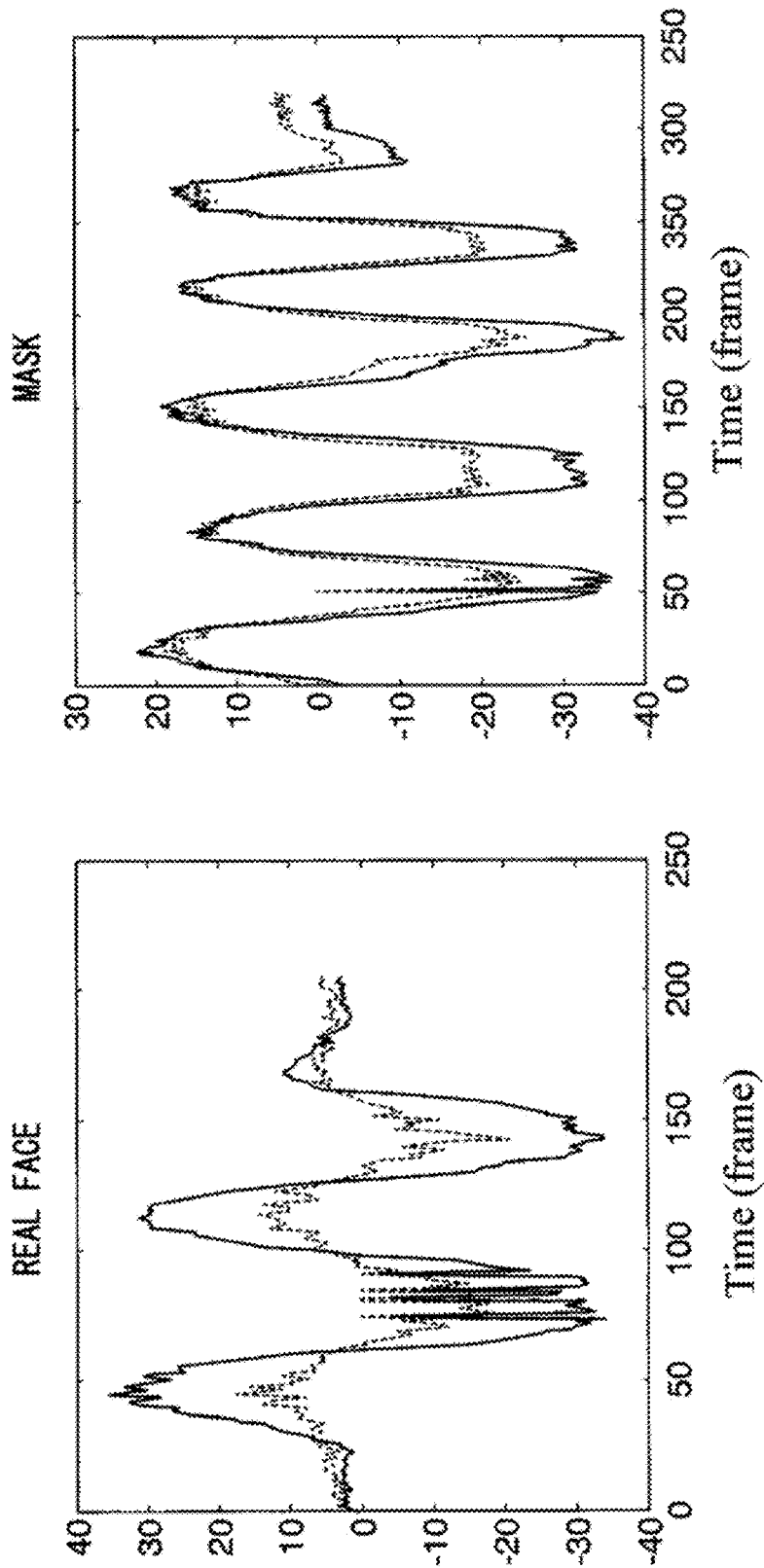
FIG. 13 is a diagram illustrating temporal changes in a face direction and a line-of-sight direction in a case where the face is swung left and right with the line-of-sight direction being fixed.

FIG. 13 is a diagram illustrating temporal changes in a face direction and a line-of-sight direction in a case where the face is swung left and right with the line-of-sight direction being fixed. In both graphs, the solid lines represent the face directions, and the dotted lines represent the line-of-sight directions. The left graph represents a case where the face captured by the camera 10 is a real face. On the other hand, the right graph represents a case where the face captured by the camera 10 is a 3D mask. As can be seen by comparing these graphs, the difference between the face direction and the line-of-sight direction becomes relatively smaller when the 3D mask is attached.

Hence, the liveness detection apparatus 2000 determines whether or not the target object 50 is a living body based on the difference between the face direction and the line-of-sight direction. Specifically, the liveness detection apparatus 2000 acquires a plurality of captured images 40 generated at different times by the camera 10, determines the face direction and the line-of-sight direction of the face of the target person shown in each captured image 40, and computes the difference. Here, existing techniques can be used as techniques for determining the face direction and the line-of-sight direction for the face included in the image. Then, the liveness detection apparatus 2000 determines whether or not the target object 50 shown in the captured image 40 is a living body based on the difference between the face direction and the line-of-sight direction. Note that, in a case where it is necessary to distinguish the captured image 40 of the second example embodiment from the captured image 40 of the first example embodiment, the captured image 40 of the second example embodiment is also referred to as a "second captured image".

Further, in order to realize the above-described liveness detection, the liveness detection apparatus 2000 causes the display apparatus 20 of the terminal 60 to display information (hereinafter, guide information) indicating a guide for causing the target object 50 to perform a desired motion. The liveness detection apparatus 2000 outputs at least both guide information indicating a guide related to the line-of-sight direction and guide information indicating a guide related to the orientation of the face. Note that these pieces of guide information may be output simultaneously or may be output at different timings.

Figure 14:
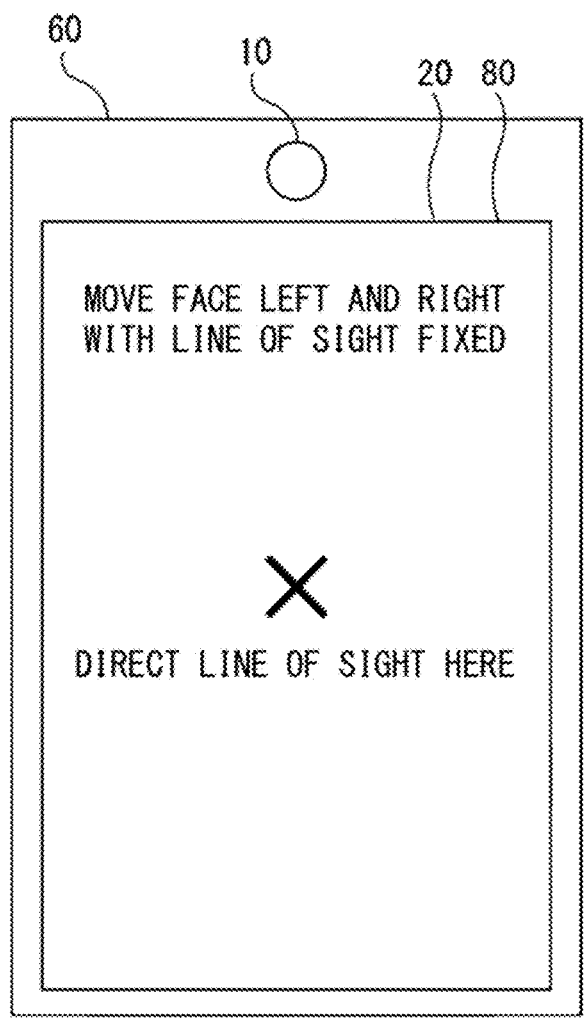
FIG. 14 is a first diagram illustrating guide information.

FIG. 14 is a first diagram illustrating guide information. In FIG. 14, a screen 80 including guide information is displayed on the display apparatus 20. The screen 80 includes, as a guide related to the line-of-sight direction, a mark indicating a position at which the line of sight should be directed, and a message such as "direct line of sight here". Further, the screen 80 includes, as a guide related to the orientation of the face, a message "move face left and right".

Note that, in the following description, unless otherwise stated, regarding the direction of the face and the line of sight of the target object 50, the front direction (the direction in which the display apparatus 20 is viewed from the front) is represented by a reference angle of 0°, the right direction is represented by a positive angle, and the left direction is represented by a negative angle.

Example of Advantageous Effect

As one of methods of impersonating another person, as described above, a method of using a 3D mask or the like on which the face of another person is drawn is conceivable. Here, as described above, in a state where the 3D mask or the like is worn, the line of sight moves together with the face, whereas in a state where the 3D mask is not worn, the line of sight can move independently of the face. Therefore, the difference between the face direction and the line-of-sight direction in the case where the 3D mask or the like is worn and that in the case where the 3D mask or the like is not worn have difference.

In this regard, with the liveness detection apparatus 2000, the camera 10 captures an image of a situation in which the motion of swinging the face left and right with the line-of-sight direction being fixed is performed. Then, the liveness detection apparatus 2000 computes a difference between the face direction and the line-of-sight direction by analyzing the captured image 40 obtained from the camera 10, and performs liveness detection based on the difference. Thus, with the liveness detection apparatus 2000, impersonation using a 3D mask or the like can be prevented.

Example of Functional Configuration

Figure 15:
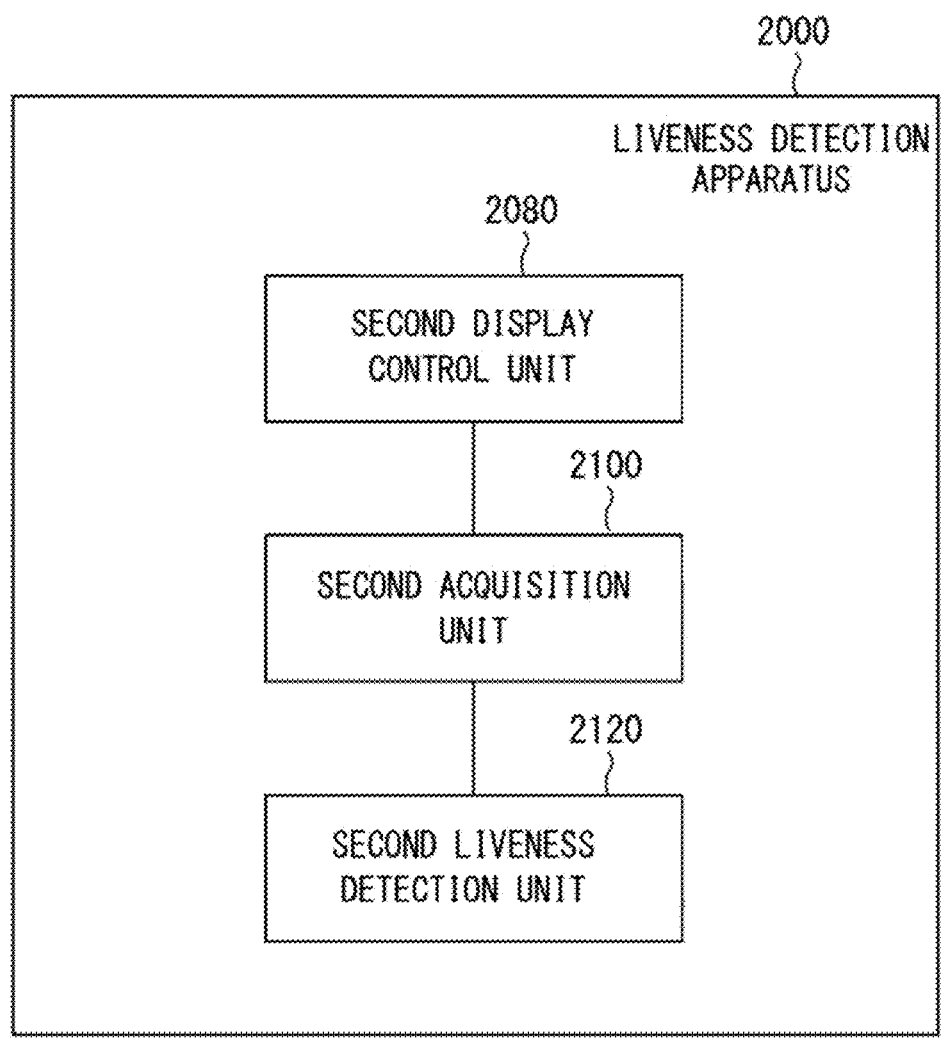
FIG. 15 is a block diagram illustrating a functional configuration of a liveness detection apparatus of a second example embodiment.

FIG. 15 is a block diagram illustrating a functional configuration of the liveness detection apparatus 2000 of the second example embodiment. The liveness detection apparatus 2000 of the second example embodiment includes a second display control unit 2080, a second acquisition unit 2100, and a second liveness detection unit 2120. The second display control unit 2080 causes the display apparatus 20 of the terminal 60 to display the guide information. The second display control unit 2080 acquires the plurality of captured images 40 generated by the camera 10 after displaying the guide information. The second liveness detection unit 2120 determines the face direction and the line-of-sight direction of the target object 50 for each of the plurality of captured images 40. Then, the second liveness detection unit 2120 determines whether or not the target object 50 is a living body based on the difference between the face direction and the line-of-sight direction determined for each captured image 40.

Example of Hardware Configuration

The hardware configuration of the liveness detection apparatus 2000 of the second example embodiment is illustrated in FIG. 3, for example, similarly to the hardware configuration of the liveness detection apparatus 2000 of the first example embodiment. However, a storage device 508 of the second example embodiment stores a program for realizing each function of the liveness detection apparatus 2000 of the second example embodiment.

<Flow of Processing>

Figure 16:
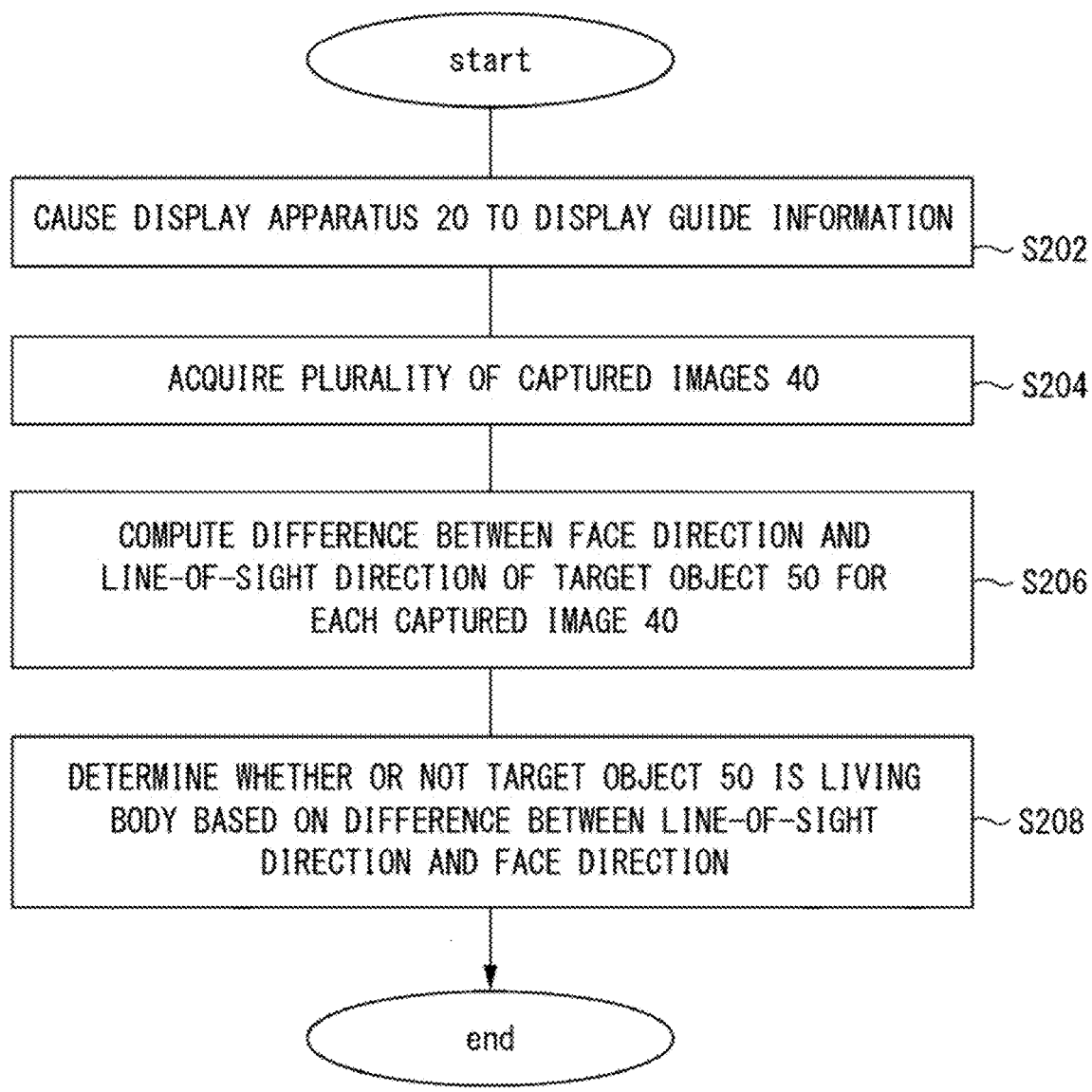
FIG. 16 is a flowchart illustrating a flow of processing executed by the liveness detection apparatus of the second example embodiment.

FIG. 16 is a flowchart illustrating a flow of processing executed by the liveness detection apparatus 2000 of the second example embodiment. The second display control unit 2080 causes the display apparatus 20 to display the guide information (S202). The second acquisition unit 2100 acquires the plurality of captured images 40 (S204). The second liveness detection unit 2120 computes a difference between the line-of-sight direction and the face direction of the target object 50 for each of the plurality of captured images 40 (S206). Note that the line-of-sight direction and the face direction are not necessarily computed for all the captured images 40. The second liveness detection unit 2120 determines whether or not the target object 50 is a living body based on the difference between the face direction and the line-of-sight direction computed for each of the plurality of captured images 40 (S208).

Note that the flow of processing executed by the liveness detection apparatus 2000 of the second example embodiment is not limited to the flow illustrated in FIG. 16. For example, the captured image 40 used by the second liveness detection unit 2120 may not be acquired all at once. For example, the liveness detection apparatus 2000 computes the difference between the face direction and the line-of-sight direction for each of the plurality of captured images 40 by repeating processing of "1) acquiring a new captured image 40, and 2) computing a difference between the face direction and the line-of-sight direction for the acquired captured image 40".

In another example, the timing at which the guide information is displayed is not limited to the timing before the captured image 40 is acquired. For example, as described below, the liveness detection apparatus 2000 may determine whether or not the motion performed by the target object 50 is an appropriate motion, and display the guide information for causing an appropriate motion to be performed in a case where the appropriate motion is not performed.

<Regarding Guide Information>

The guide information displayed on the display apparatus 20 by the second display control unit 2080 is various. For example, as in the example illustrated in FIG. 14, a guide for the line-of-sight direction indicates a position where the line of sight should be fixed, and a guide for the face direction indicates a direction in which the face should be moved. By looking at this guide, it can be seen that the target object 50 should swing the face left and right with the line-of-sight direction being fixed.

Figure 17:
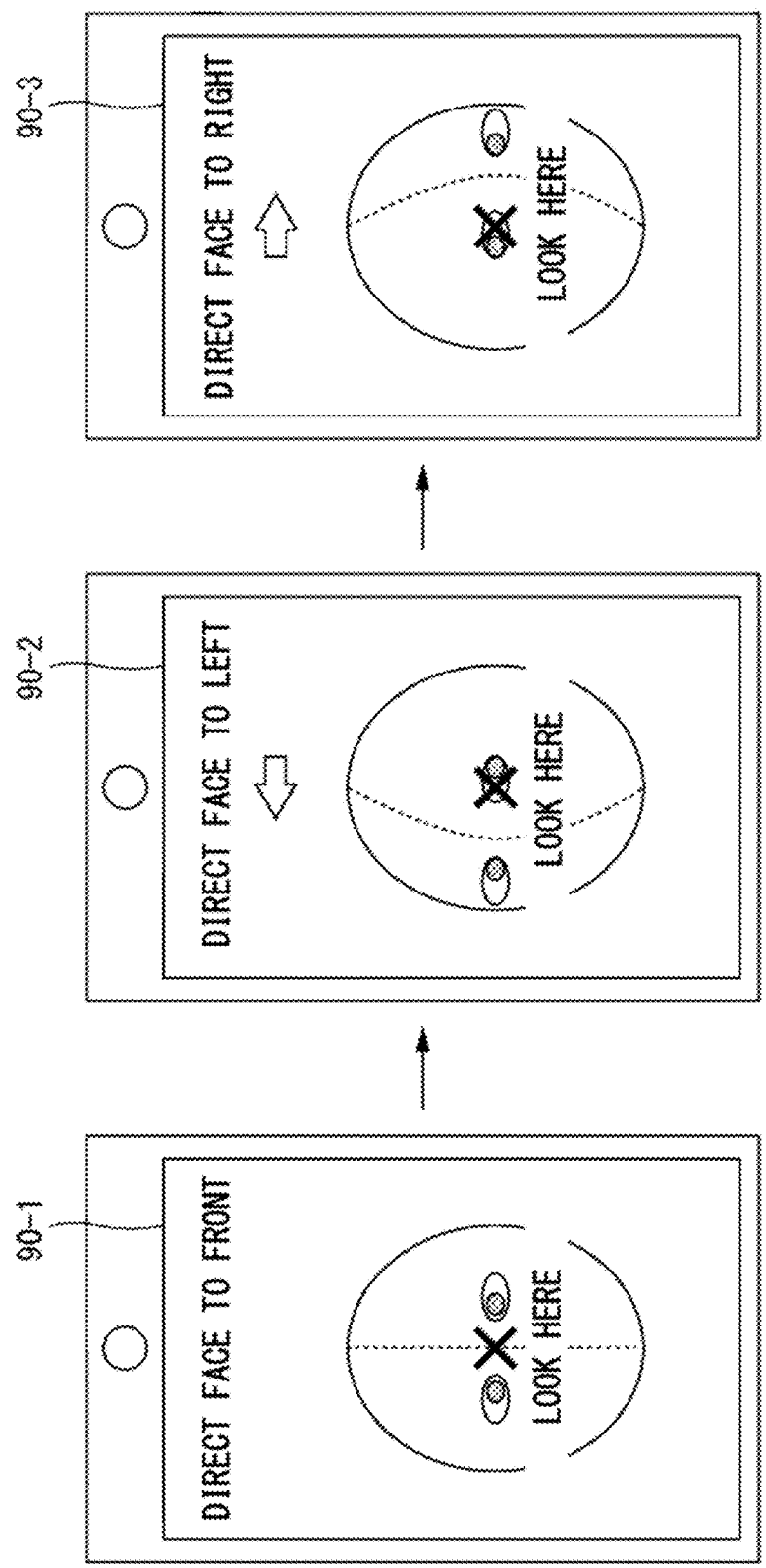
FIG. 17 is a diagram illustrating guide information indicating an action that a target object should perform next.

In another example, the second display control unit 2080 displays the guide information indicating an action that the target object 50 should perform next according to the movement of the face of the target object 50. FIG. 17 is a diagram illustrating guide information indicating an action that the target object 50 should perform next. A screen 90-1 to a screen 90-3 displayed on the display apparatus 20 in FIG. 17 display guide information including a message with respect to the target object 50, a guide indicating a position at which a line of sight should be directed, and a guide indicating a direction in which a face should be directed. By displaying such guides on the display apparatus 20, the target object 50 can easily grasp which direction they should face.

First, the second display control unit 2080 causes the display apparatus 20 to display the screen 90-1. In the guide information displayed on the screen 90-1, a message prompting to face the front and an image of the face facing the front are displayed as guides related to the face direction. Further, a cross mark and an image of an eye is displayed as guides regarding the line-of-sight direction.

The second display control unit 2080 determines whether the face of the target object 50 faces the front. The face direction of the target object 50 is computed by the second liveness detection unit 2120 using the captured image 40.

Here, it is preferable that the screen 90-1 be continuously displayed until the face of the target object 50 faces the front. In this way, it is possible to avoid starting the liveness detection until the face of the target object 50 faces the front direction, which is the reference. However, in a case where the face of the target object 50 does not face the front even after a predetermined time elapses, it may be determined that the target object 50 is not a living body due to timeout.

On the other hand, when it is determined that the face of the target object 50 faces the front, the second display control unit 2080 causes the display apparatus 20 to display the screen 90-2. On the screen 90-2, a message prompting to face left, a leftward arrow, and an image of a face facing left are displayed as guides regarding the face direction. Further, a cross mark and an image of an eye are displayed as guides regarding the line-of-sight direction.

The second display control unit 2080 determines whether the face of the target object 50 faces left. For example, when the face direction of the target object 50 is equal to or less than a threshold, it is determined that the face of the target object 50 faces left.

The screen 90-2 is continuously displayed on the display apparatus 20 until the face of the target object 50 faces left. However, in a case where the face of the target object 50 does not face the front even after a predetermined time elapses, it may be determined that the target object 50 is not a living body due to timeout.

On the other hand, when it is determined that the face of the target object 50 faces left, the second display control unit 2080 causes the display apparatus 20 to display the screen 90-3. On the screen 90-3, a message prompting to face right, a rightward arrow, and an image of a face facing right are displayed as guides regarding the face direction. Further, a cross mark and an image of an eye are displayed as guides related to the line-of-sight direction.

As described above, by sequentially displaying the screen 90-1, the screen 90-2, and the screen 90-3, it is possible to prompt the target object 50 to change the face direction in the order of the front, the left, and the right with the line of sight being fixed. In addition, thereafter, by further alternately displaying the screen 90-2 and the screen 90-3, it is possible to prompt the target object 50 to repeatedly move the face direction left and right.

Figure 18:
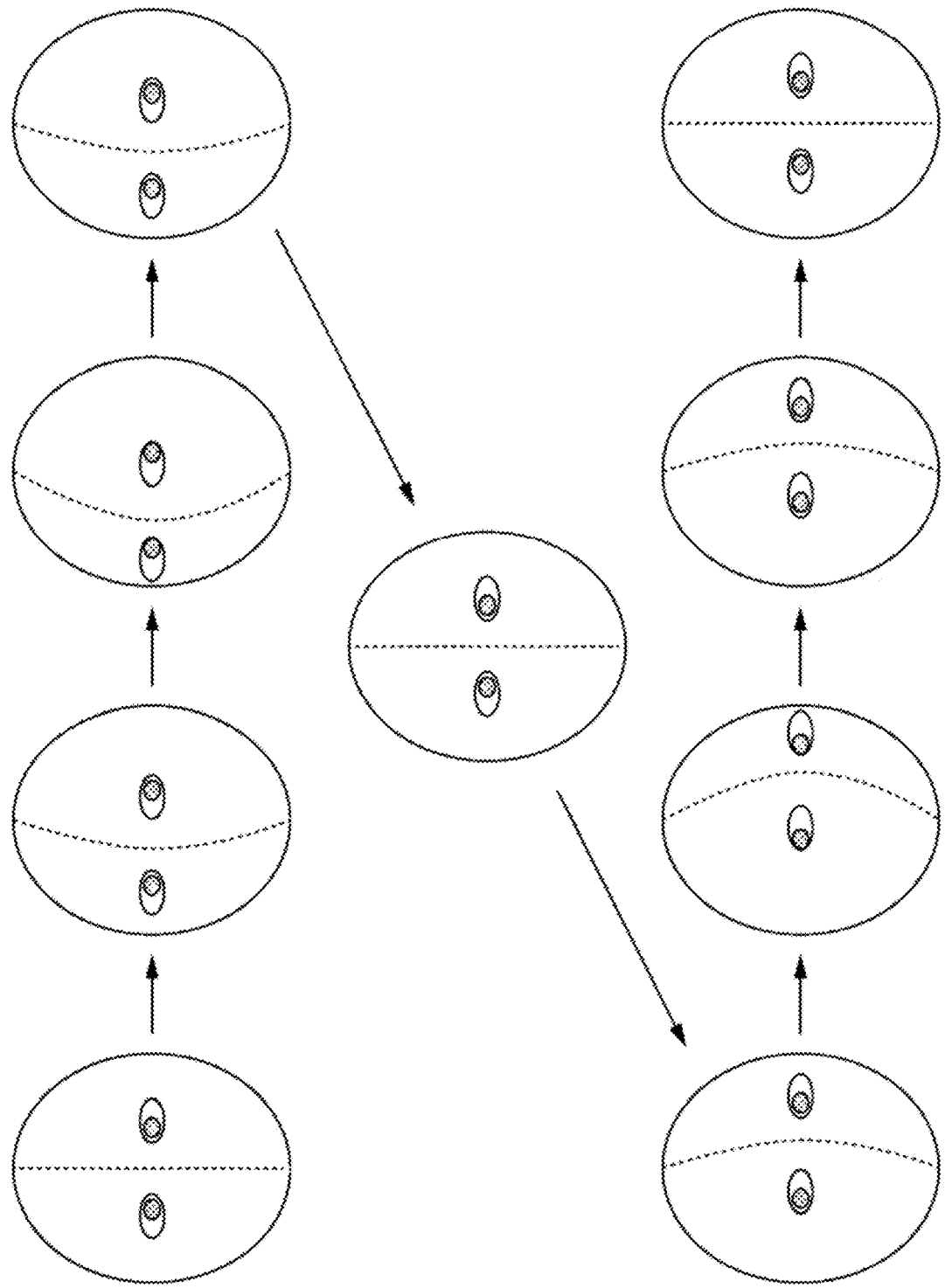
FIG. 18 is a diagram illustrating animation of a guide indicating the face direction.

Note that a guide indicating the face direction may be displayed by animation so that the target object 50 can more easily understand how to move the face. FIG. 18 is a diagram illustrating animation of a guide indicating the face direction.

Here, the guide information is preferably displayed on the display apparatus 20 together with the captured image 40 generated by the camera 10. For example, in a mobile terminal such as a smartphone, when a camera is used, a result of capturing by the camera can be displayed on the display apparatus in real time. Hence, also in the terminal 60, as described above, the captured image 40 generated by the camera 10 is displayed on the display apparatus 20 in real time, and the guide information is displayed on the display apparatus 20 together with the captured image 40 (for example, superimposed on the captured image 40). In this way, the target object 50 can perform a motion of swinging the face left and right with the line of sight being fixed while checking the state of its own face and line of sight.

For example, in the case of the guide information of the animation illustrated in FIG. 18, it is preferable to cause the display apparatus 20 to display the captured image 40 generated by the camera 10 in real time together with the animation. By doing so, the target object 50 can appropriately swing the face left and right by moving its own face in such a manner that the animation and its own face overlap each other. Therefore, the target object 50 can more intuitively perform the motion necessary for the liveness detection. However, the animation representing the movement of the face may be displayed at a position not overlapping the face of the target object 50 (for example, a corner of the screen).

In another example, in a case where the motion performed by the target object 50 is not an appropriate motion, the second display control unit 2080 may display the guide information for enabling the target object 50 to perform an appropriate motion. For example, the second display control unit 2080 determines whether the magnitude of the face swing width of the target object 50 is sufficiently large (equal to or greater than a threshold). The face swing width of the target object 50 can be computed as a difference between the maximum value and the minimum value in the face direction of the target object 50.

When the magnitude of the face swing width of the target object 50 is smaller than the threshold, the second display control unit 2080 causes the display apparatus 20 to display the guide information requiring an increase in face swing width. For example, the guide information including a message such as "move face more largely" is displayed. By displaying such guide information, it is possible for the target object 50 to grasp that the face should be swung more largely. Then, when the face swing width is further increased according to such a guide, the difference between the face direction and the line-of-sight direction becomes larger in a case where the target object 50 is a real face. Therefore, the liveness detection can be performed with higher accuracy.

As another case where the motion performed by the target object 50 is not appropriate, a case where the line of sight of the target object 50 is not fixed is conceivable. Hence, for example, the second display control unit 2080 determines whether or not the line of sight of the target object 50 is fixed, and causes the display apparatus 20 to display the guide information including a message prompting to fix the line of sight in a case where the line of sight of the target object 50 is not fixed. For example, guide information including a message such as "do not move line of sight" is displayed. By displaying such guide information, it is possible for the target object 50 to grasp that the line-of-sight direction has not been fixed.

Note that whether or not the line of sight is fixed can be computed, for example, based on a change in the line-of-sight direction. For example, when the absolute value of the difference between the line-of-sight direction computed when the target object 50 faces the front and the current line-of-sight direction becomes equal to or larger than a threshold, it is determined that the line of sight is not fixed.

Figure 19:
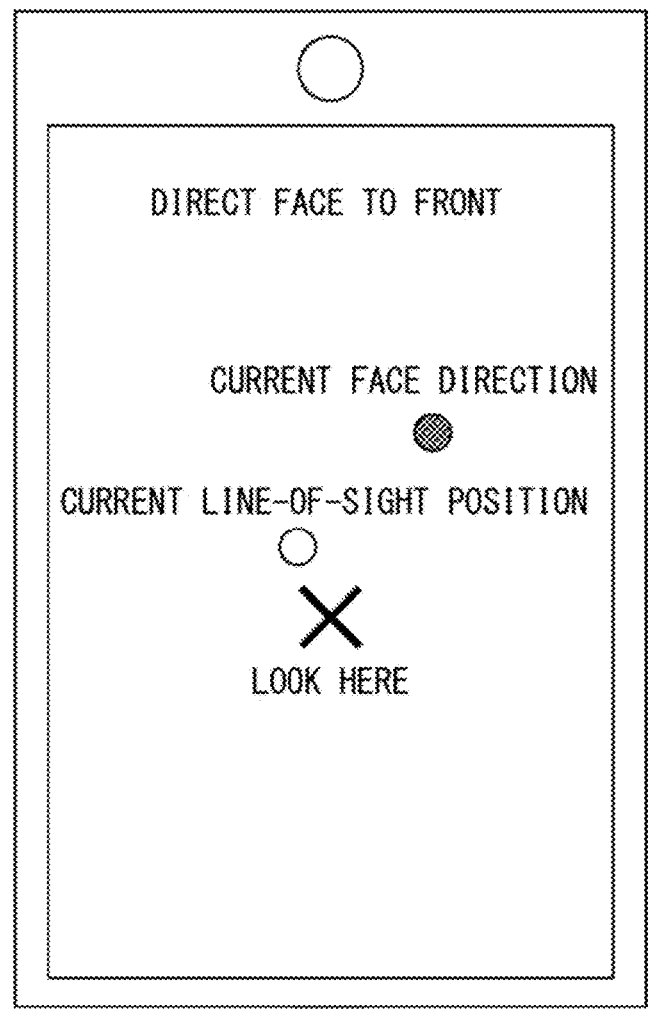
FIG. 19 is a diagram illustrating guide information including a line-of-sight position and a face direction of a target object.

The second display control unit 2080 may cause the display apparatus 20 to display the guide information indicating the line-of-sight position and the orientation of the face of the target object 50 so that the target object 50 can grasp its own line-of-sight position and face direction. FIG. 19 is a diagram illustrating guide information including a line-of-sight position and a face direction of the target object 50. In FIG. 19, the current line-of-sight position is indicated by a white circle. The target object 50 can intuitively fix the line of sight by adjusting the line-of-sight position such that the white circle overlaps a cross mark.

Further, in FIG. 19, the current face direction is indicated by a black circle. The target object 50 can intuitively grasp which direction its own face is facing by looking at the black circle. Note that FIG. 19 illustrates a case where the target object 50 is required to face the front. Therefore, the target object 50 can intuitively direct the face in the front direction by adjusting the face direction such that the black circle overlaps the cross mark.

Note that, in a case where the series of processing of the liveness detection is started when the target object 50 faces the front direction, the liveness detection apparatus 2000 may determine whether or not both the white circle and the black circle overlap the cross mark in the example of FIG. 19, and may start the series of processing of the liveness detection when it is determined that both overlap the cross mark.

Figure 20:
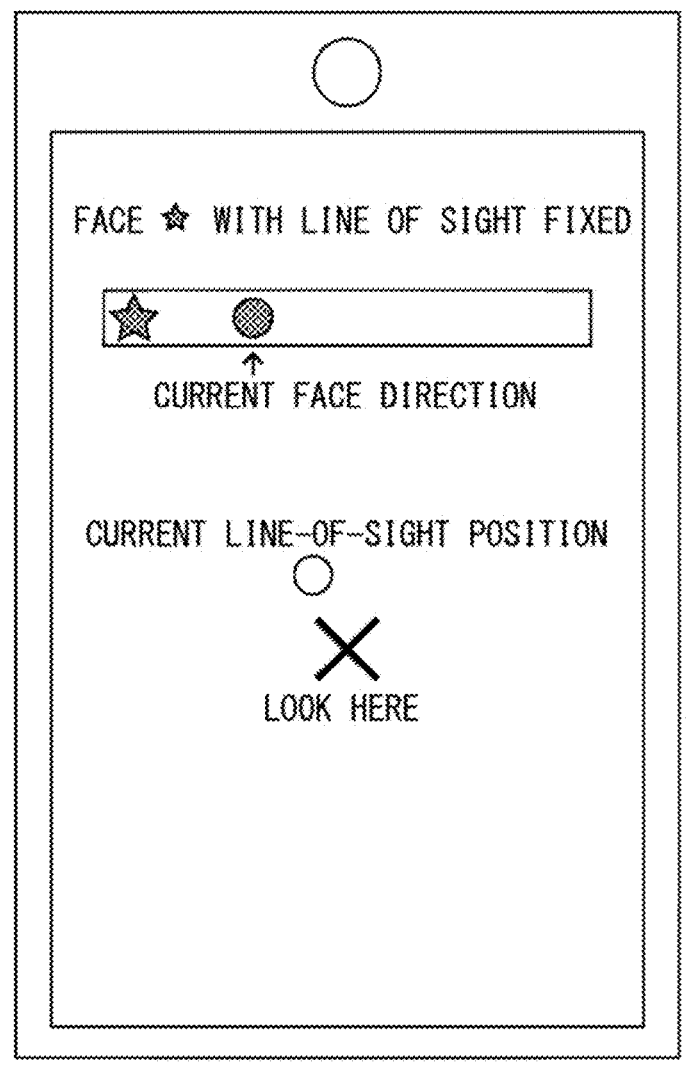
FIG. 20 is a second diagram illustrating guide information including a line-of-sight position and a face direction of a target object.

The guide indicating the face direction is not limited to that illustrated in FIG. 19. FIG. 20 is a second diagram illustrating guide information including a line-of-sight position and a face direction of the target object 50. In FIG. 20, marks indicating the current line-of-sight position and the current face direction are similar to those in FIG. 19.

In FIG. 20, a black circle indicating the face direction is displayed in a horizontal rectangular frame. Further, a black star mark is displayed as a mark indicating a target of the face direction. Furthermore, a message prompting to move the face direction to the direction of the star mark is also displayed. The target object 50 can intuitively change the face direction to an appropriate direction by changing the face direction such that the black circle overlaps the black star mark.

Note that, in a case where the face direction has moved to a maximum direction (black star mark in FIG. 20), the liveness detection apparatus 2000 may cause the display apparatus 20 to display guide information prompting to keep the face direction in the direction for a certain period of time (for example, 2 seconds).

As another case where the motion performed by the target object 50 is not appropriate, a case where the movement of the face is too fast is conceivable. Hence, in a case where the movement of the face is too fast, the second display control unit 2080 may cause the display apparatus 20 to display a guide prompting to slow down the movement of the face. The speed of movement of the face can be expressed by, for example, a difference in position of the face between the captured images 40 adjacent in time series. In another example, the difference in movement of the face may be represented by a temporal change amount in the face direction.

For example, the second display control unit 2080 determines whether or not the speed of movement of the face is equal to or greater than a threshold. Then, in a case where the speed of the movement of the face is equal to or greater than the threshold, the second display control unit 2080 causes the display apparatus 20 to display a guide information prompting to slow down the movement of the face. This guide information includes, for example, a message such as "move face more slowly". In another example, the animation of the movement of the face illustrated in FIG. 17 may be included in the guide information. In this case, in the animation included in the guide information, the face may be moved slower than that in a normal situation.

Note that the second display control unit 2080 may display a guide regarding the posture of a torso portion (for example, a shoulder or the like) in addition to the face. For example, the second display control unit 2080 computes the direction of the torso of the target object 50 using the captured image 40, and determines whether or not the torso faces the front (for example, whether or not the absolute value of the difference between the direction of the torso and the front direction is equal to or less than a threshold) based on the computed direction of the torso. Then, in a case where it is determined that the torso does not face the front, the second display control unit 2080 causes the display apparatus 20 to display guide information prompting to direct the torso to the front. For example, the guide information includes a message such as "direct the torso to the front". In another example, the guide information may include an image of the torso facing the front direction.

In the above example, the guide information is displayed on the display apparatus 20. However, in addition to the display on the display apparatus 20 or instead of the display on the display apparatus 20, the guide information may be output by voice. For example, various messages such as "face the front" and "face the left with line of sight fixed" are output as voice messages. Further, as described above, in a case where it is detected that the motion of the target object 50 is not appropriate, a voice message corresponding to the detected state may be output. For example, a voice message such as "direct the line of sight a little more toward the upper right" or "move the face a little more slowly" is output. Further, in a case where a direction can be expressed by a voice such as a stereo voice or the like, a direction in which the line of sight or the face should be directed may be expressed by the direction of the voice. For example, a message "direct the face in the direction in which the sound is output" is output by a voice heard from the right direction.

<Liveness detection: S206 and S208>

For each captured image 40, the second liveness detection unit 2120 computes the face direction and the line-of-sight direction of the target object 50 using the image of the face of the target object 50 included in the captured image 40, and computes a difference therebetween (S206). Then, whether or not the target object 50 is a living body is determined based on the difference between the face direction and the line-of-sight direction computed for each captured image 40 (S208). For example, in a case where there is a sufficient difference between the face direction and the line-of-sight direction of the target object 50, the second liveness detection unit 2120 determines that the target object 50 is a living body. On the other hand, when there is no sufficient difference between the face direction and the line-of-sight direction of the target object 50, the second liveness detection unit 2120 determines that the target object 50 is not a living body.

Whether or not there is a sufficient difference between the face direction and the line-of-sight direction of the target object 50 is determined, for example, by comparing a difference between the face direction and the line-of-sight direction with a threshold. As a specific example, the second liveness detection unit 2120 computes a difference between the face direction and the line-of-sight direction for each captured image 40, and determines whether or not a maximum value of the difference between the face direction and the line-of-sight direction is equal to or greater than a first threshold. When the maximum value of the difference between the face direction and the line-of-sight direction is equal to or greater than the first threshold, it is determined that there is a sufficient difference between the face direction and the line-of-sight direction. On the other hand, when the maximum value of the difference between the face direction and the line-of-sight direction is less than the first threshold, it is determined that there is no sufficient difference between the face direction and the line-of-sight direction. Here, since the right direction is assumed to be the positive direction, the maximum value of the difference between the face direction and the line-of-sight direction being equal to or greater than the first threshold means that there is a sufficient difference between the face direction and the line-of-sight direction when the face is directed rightward (in other words, the face is directed rightward sufficiently largely with the line of sight being fixed).

In another example, whether or not there is a sufficient difference between the face direction and the line-of-sight direction of the target object 50 is determined by comparing the minimum value of the difference between the face direction and the line-of-sight direction with a second threshold. When the minimum value of the difference between the face direction and the line-of-sight direction is equal to or less than the second threshold, it is determined that there is a sufficient difference between the face direction and the line-of-sight direction. On the other hand, when the minimum value of the difference between the face direction and the line-of-sight direction is greater than the second threshold, it is determined that there is no sufficient difference between the face direction and the line-of-sight direction. Here, since the left direction is assumed to be the negative direction, the minimum value of the difference between the face direction and the line-of-sight direction being equal to or less than the second threshold means that there is a sufficient difference between the face direction and the line-of-sight direction when the face is directed leftward (in other words, the face is directed leftward sufficiently largely with the line of sight being fixed).

The second liveness detection unit 2120 may determine that there is a sufficient difference between the face direction and the line-of-sight direction in a case where the face is sufficiently swung both left and right with the line of sight being fixed. In this case, for example, the second liveness detection unit 2120 determines whether or not "the maximum value of the difference between the face direction and the line-of-sight direction is equal to or greater than the first threshold and the minimum value of the difference between the face direction and the line-of-sight direction is equal to or less than the second threshold". In a case where the maximum value of the difference between the face direction and the line-of-sight direction is equal to or greater than the first threshold and the minimum value of the difference between the face direction and the line-of-sight direction is equal to or less than the second threshold, the second liveness detection unit 2120 determines that there is a sufficient difference between the face direction and the line-of-sight direction. On the other hand, in a case where the maximum value of the difference between the face direction and the line-of-sight direction is not equal to or greater than the first threshold or the minimum value of the difference between the face direction and the line-of-sight direction is not equal to or less than the second threshold, the second liveness detection unit 2120 determines that there is no sufficient difference between the face direction and the line-of-sight direction.

By making the determination for both the left and right directions in this manner, impersonation using a 3D mask or the like can be prevented with higher accuracy. For example, in a certain 3D mask, it is assumed that the direction of the drawn line of sight is largely biased to the right. Then, it is assumed that the target object 50 tries to impersonate by wearing the 3D mask. In this case, when the target object 50 directs the face to the left, the difference between the face direction and the line-of-sight direction increases because the face is directed to the left while the line of sight is directed to the right. Therefore, when the user faces left, there is a possibility that it is difficult to detect impersonation based on the difference between the face direction and the line-of-sight direction. On the other hand, when the user faces right in this case, since both the face and the line of sight face to the right, the difference between the face direction and the line-of-sight direction becomes small. Therefore, when the user faces right, impersonation can be detected based on the difference between the face direction and the line-of-sight direction. From the above, it is preferable to direct the target object 50 to face left and right.

The liveness detection apparatus 2000 may cause the target object 50 to perform a series of motions of swinging the face left and right a plurality of times, and determine whether or not there is a sufficient difference between the face direction and the line-of-sight direction for each of the plurality of motions. The series of motions of swinging the face left and right is a series of motions of "direct the face to the left, and then direct the face to the right" or a series of motions of "direct the face to the right, and then direct the face to the left". For example, the second liveness detection unit 2120 treats a series of motions of swinging the face left and right as one set, and detects a plurality of motions of the set by analyzing the plurality of captured images 40. The second liveness detection unit 2120 computes one or both of the maximum value and the minimum value of the difference between the face direction and the line-of-sight direction for each set, and determines whether or not the target object 50 is a living body according to the computation result.

For example, the second liveness detection unit 2120 determines whether or not there is a sufficient difference between the face direction and the line-of-sight direction for each of a predetermined number n (n is an integer) of sets. Then, the second liveness detection unit 2120 determines whether or not the number of sets determined to have a sufficient difference between the face direction and the line-of-sight direction is a predetermined number m (m is an integer being larger than or equal to 1 and being less than or equal to n) or more. In a case where the number of sets determined to have a sufficient difference between the face direction and the line-of-sight direction is m or more, the second liveness detection unit 2120 determines that the target object 50 is a living body. On the other hand, in a case where the number of sets determined to have a sufficient difference between the face direction and the line-of-sight direction is less than the predetermined number m, the second liveness detection unit 2120 determines that the target object 50 is not a living body.

In another example, the second liveness detection unit 2120 may determine whether or not there is a sufficient difference between the face direction and the line-of-sight direction for each set detected within a predetermined time, and may determine that the target object 50 is a living body in a case where the number of sets determined to have a sufficient difference between the face direction and the line-of-sight direction is m or more.

In another example, the second liveness detection unit 2120 may cause the target object 50 to repeat the motion of swinging the face left and right until the number of sets determined to have a sufficient difference between the face direction and the line-of-sight direction becomes m or more. In this case, every time the target object 50 performs a series of motions of swinging the face left and right, the second liveness detection unit 2120 determines whether or not there is a sufficient difference between the face direction and the line-of-sight direction regarding the series of motions. When it is determined that there is a sufficient difference between the face direction and the line-of-sight direction, a counter is incremented by 1. In a case where the counter is m or more, the second liveness detection unit 2120 determines that the target object 50 is a living body. On the other hand, when the counter does not become m or more (for example, in a case where a predetermined time has elapsed before the counter becomes m or more), the second liveness detection unit 2120 determines that the target object 50 is not a living body.

Note that, in a case where the motion of swinging the face left and right is not performed correctly, the above-described counter may be initialized to zero. Cases where the motion of swinging the face left and right is not correctly performed include 1) a case where the face is not sufficiently directed to the left or right (for example, in the example of FIG. 25, a case where the face is directed to the right before a black circle overlaps a black star mark), and 2) a case where it is determined that there is no sufficient difference between the face direction and the line-of-sight direction. When the counter is initialized in this manner, it is determined that the target object 50 is a living body only when a correct motion of swinging the face left and right is performed m times continuously. On the other hand, it is not determined that the target object 50 is a living body until a correct motion of swinging the face left and right is performed m times continuously. Note that an upper limit may be set to the number of times for the initialization of the counter, and in a case where the number of times of the initialization of the counter reaches the upper limit, it may be determined that the target object 50 is not a living body. Further, a time limit may be set for the time for performing the motion, and in a case where the motion of swinging the face left and right is not performed correctly m times continuously within the time limit, it may be determined that the target object 50 is not a living body.

Instead of treating the motion of directing the face to the right and the motion of directing the face to the left as a set, these motions may be individually counted. In this case, the numbers of times (the predetermined number m described above) that the motion of directing the face to the right and the motion of directing the face to the left should be performed may be the same as or different from each other. In the latter case, for example, "requiring the motion of directing the face to the left three times, and requiring the motion of directing the face to the right two times" or the like can be performed.

Note that, in a case where the motion of swinging the face left and right is performed a plurality of times in this manner, the display control unit 2020 may cause the display apparatus 20 to display the number of the times that the motion has been performed correctly. Further, every time the motion is performed, a display (display such as a circle or OK) that indicates a determination result as to whether the motion has been performed correctly may be displayed on the display apparatus 20.

First Modified Example of Second Example Embodiment

Figure 21:
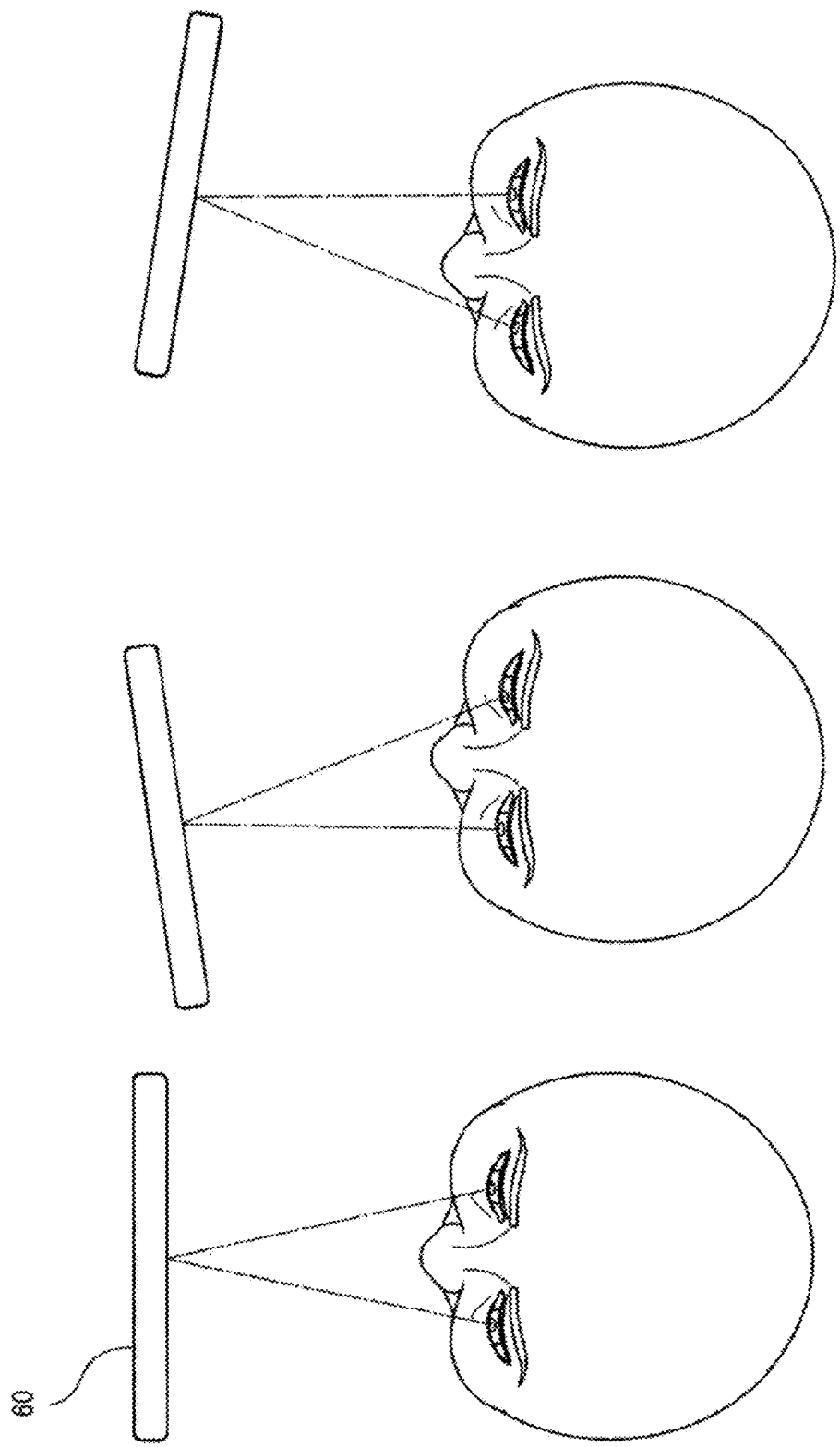
FIG. 21 is a diagram illustrating a motion of a target object in a liveness detection apparatus of a first modified example of the second example embodiment.

In the liveness detection apparatus 2000 of the second example embodiment, the display apparatus 20 may be moved left and right while the line of sight is fixed at a specific position (for example, a cross mark in FIG. 14 or the like) on the display apparatus 20 without moving the face. FIG. 21 is a diagram illustrating a motion of a target object 50 in a liveness detection apparatus of the first modified example of the second example embodiment. Also in this case, assuming that the front direction of a display apparatus 20 is a reference direction (0°), the face direction and the line-of-sight direction change similarly as in the graph illustrated in FIG. 13. Therefore, also in a liveness detection apparatus 2000 of the present modified example, the difference between the face direction and the line-of-sight direction of the target object 50 is computed for each of a plurality of captured images 40, and it is possible to determine whether or not the target object 50 is a living body based on the difference.

A specific method for determining whether the target object 50 is a living body is as described above. However, instead of detecting the motion of swinging the face left and right, the liveness detection apparatus 2000 detects the motion of swinging the display apparatus 20 left and right. Note that the motion of swinging the display apparatus 20 left and right can be detected based on a change in the face direction with respect to the display apparatus 20. For example, whether the display apparatus 20 has been moved sufficiently right can be determined by determining whether the face direction relative to the display apparatus 20 has been moved sufficiently left. Similarly, whether the display apparatus 20 has been moved sufficiently left can be determined by determining whether the face direction relative to the display apparatus 20 has been moved sufficiently right.

Here, in the liveness detection apparatus 2000 of the present modified example, guide information may include those different from the case of the second example embodiment. Specifically, the liveness detection apparatus 2000 causes the display apparatus 20 to display the guide information prompting to swing a terminal 60 left and right instead of prompting to swing the face left and right. Further, it is preferable to display guide information prompting not to move the face.

Figure 22:
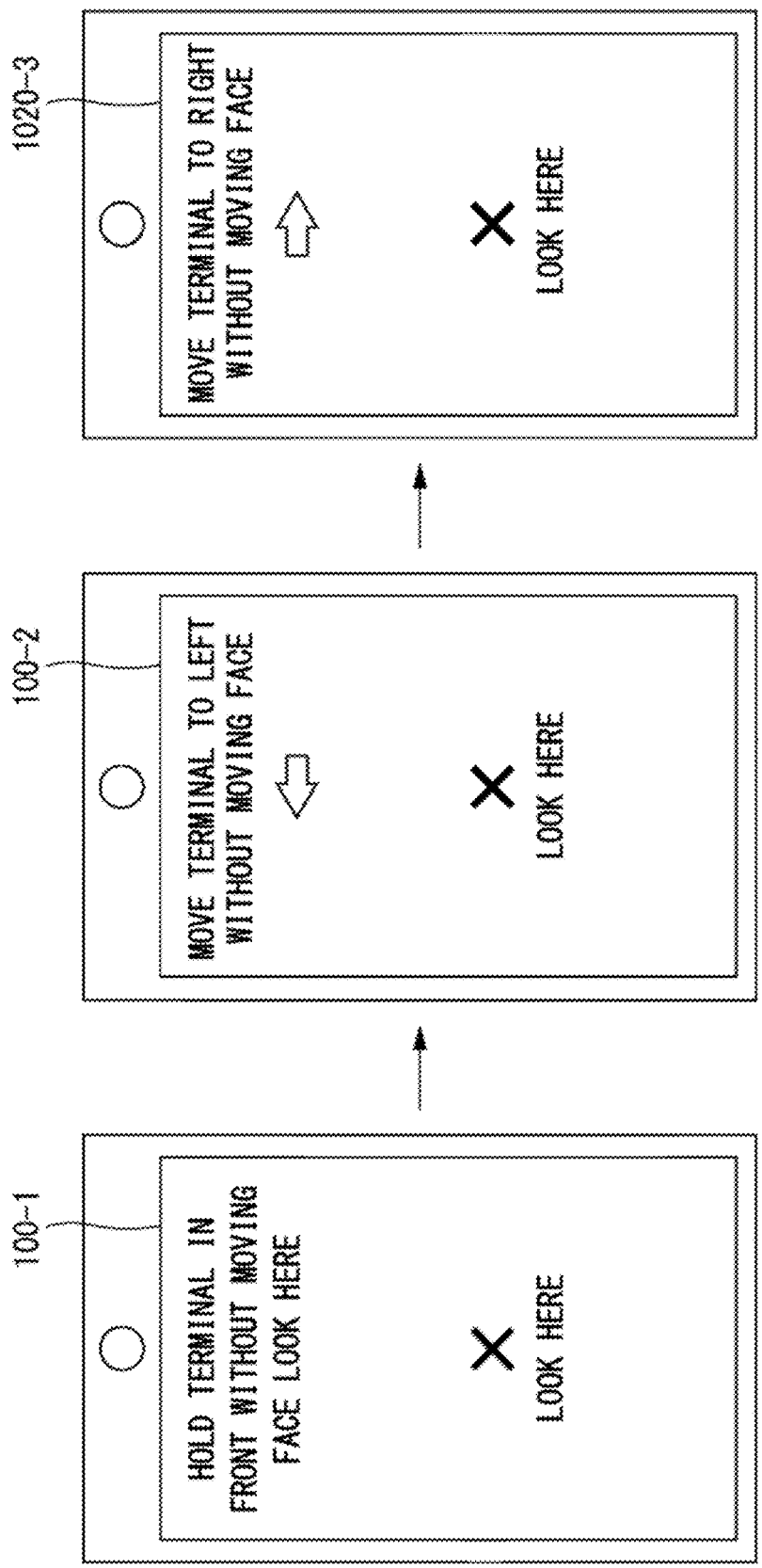
FIG. 22 is a diagram illustrating guide information of the liveness detection apparatus of the first modified example of the second example embodiment.

FIG. 22 is a diagram illustrating guide information of the liveness detection apparatus 2000 of the first modified example of the second example embodiment. In this example, first, a screen 100-1 is displayed. The screen 100-1 displays a message prompting to hold the terminal 60 (display apparatus 20) in front without moving the face and with the line of sight being fixed at a cross mark on the display apparatus 20.

Thereafter, a screen 100-2 is displayed. The screen 100-2 displays a message prompting to move the terminal 60 to the left without moving the face and with the line of sight being fixed at the cross mark on the display apparatus 20. The screen 100-2 is displayed, for example, in response to detection that both the line-of-sight direction and the face direction of the target object 50 are directed to the front with respect to the display apparatus 20.

Thereafter, a screen 100-3 is displayed. The screen 100-3 displays a message prompting to move the terminal 60 to the right without moving the face and with the line of sight being fixed at the cross mark on the display apparatus 20. The screen 100-3 is displayed, for example, in response to detection that the terminal 60 has been sufficiently moved to the left without moving the face and with the line of sight being fixed at the cross mark on the display apparatus 20. The determination as to whether or not the terminal 60 has been sufficiently moved to the left can be realized by, for example, determining whether or not the face direction has been sufficiently directed to the right (determining whether or not the face direction has become equal to or greater than a positive threshold).

Note that, in a case where the terminal 60 is repeatedly moved left and right, the screen 100-2 is displayed again. The screen 100-2 is displayed, for example, in response to detection that the terminal 60 has been sufficiently moved to the right without moving the face and with the line of sight being fixed at the cross mark on the display apparatus 20. The determination as to whether or not the terminal 60 has been sufficiently moved to the right can be realized by, for example, determining whether or not the face direction has been sufficiently directed to the left (determining whether or not the face direction has become equal to or less than a negative threshold).

Second Modified Example of Second Example Embodiment

Figure 23:
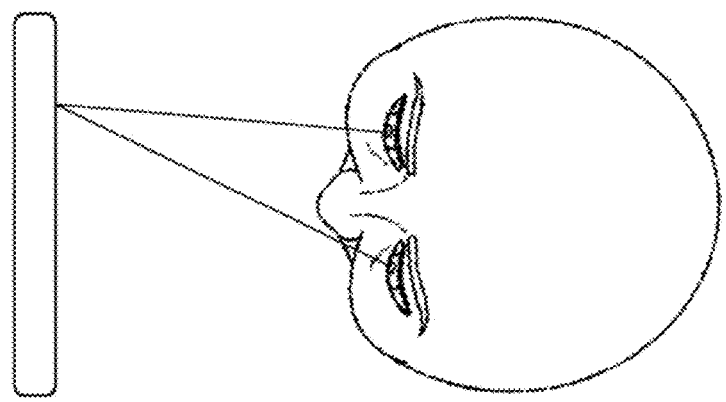
FIG. 23 is a diagram illustrating a motion of a target object in a liveness detection apparatus of a second modified example of the second example embodiment.
Figure 23:
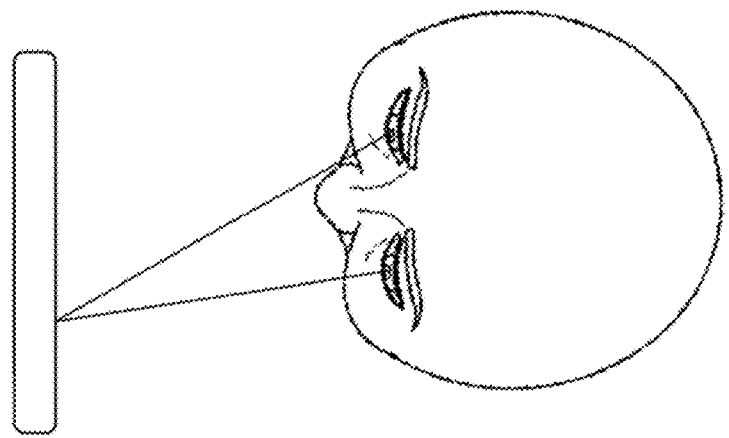
Figure 23:
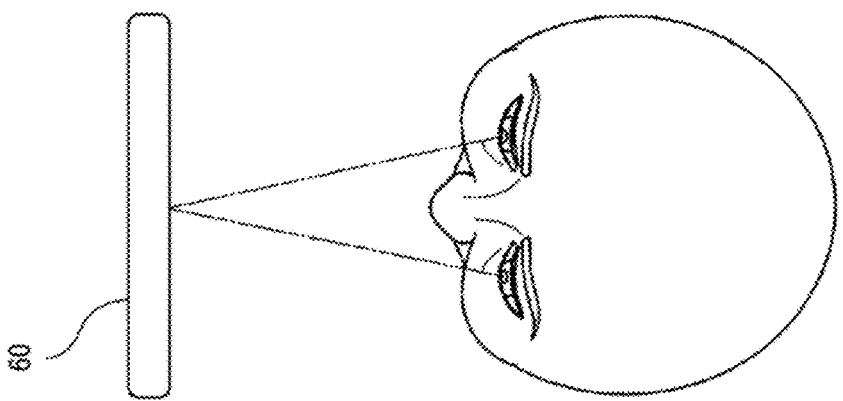

In the liveness detection apparatus 2000 of the second example embodiment, the line of sight may be swung left and right while the display apparatus 20 and the orientation of the face are fixed (without moving the display apparatus 20 and the orientation of the face remains directed to the front of the display apparatus 20). FIG. 23 is a diagram illustrating a motion of a target object 50 in a liveness detection apparatus 2000 of the second modified example of the second example embodiment.

This case means that the line-of-sight direction and the face direction are handled in the opposite way in the liveness detection apparatus 2000 of the second example embodiment. That is, instead of fixing the line-of-sight direction, the face direction is fixed, and instead of swinging the face left and right, the line of sight is swung left and right. Further, in guide information, the same guide as the guide performed for the line-of-sight direction in the liveness detection apparatus 2000 of the second example embodiment is performed for the face direction in a liveness detection apparatus 2000 of the second modified example of the second example embodiment. That is, instead of a guide for fixing the line-of-sight direction, a guide for fixing the face direction is displayed. Furthermore, the same guide as the guide performed for the face direction in the liveness detection apparatus 2000 of the second example embodiment is performed for the line of sight direction in the liveness detection apparatus 2000 of the second modified example of the second example embodiment. That is, instead of a guide that directs the face direction to the front or the left or right, a guide that directs the line of sight to the front or the left or right is displayed.

Figure 24:
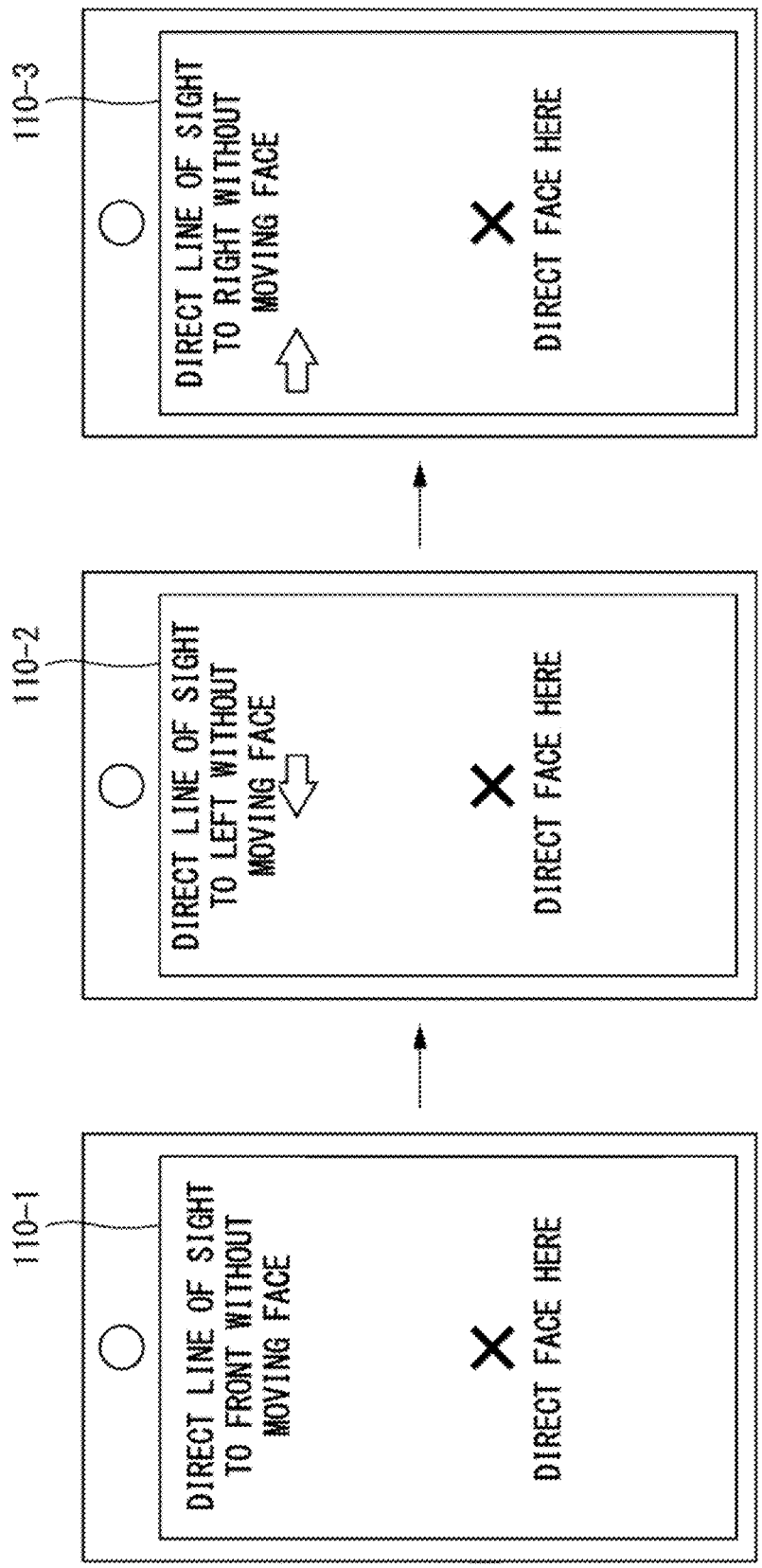
FIG. 24 is a diagram illustrating guide information of the liveness detection apparatus of the second modified example of the second example embodiment.

FIG. 24 is a diagram illustrating guide information of the liveness detection apparatus 2000 of the second modified example of the second example embodiment. In this example, first, a screen 110-1 is displayed. The screen 110-1 displays a message prompting to direct the line of sight to the front of a display apparatus 20 without moving the face.

Thereafter, a screen 110-2 is displayed. On the screen 110-2, a message prompting to move the line of sight to the left without moving the face is displayed. The screen 110-2 is displayed, for example, in response to detection that both the line-of-sight direction and the face direction of the target object 50 are directed to the front with respect to the display apparatus 20.

Thereafter, a screen 110-3 is displayed. On the screen 110-3, a message prompting to move the line of sight to the right without moving the face is displayed. The screen 110-3 is displayed, for example, in response to detection that the line of sight has been sufficiently moved to the left (the line-of-sight direction has become equal to or less than a negative threshold) in a state where the face direction is fixed to the front. Note that, on the screen 110-3, since viewing is performed in a state where the line of sight is directed to the left, a rightward arrow is displayed at a leftward position.

Note that, in a case where the line of sight is repeatedly moved left and right, the screen 110-2 is displayed again. The screen 110-2 is displayed, for example, in response to detection that the line of sight has been sufficiently moved to the right (the line-of-sight direction has become equal to or greater than a positive threshold) in a state where the face direction is fixed to the front. However, since viewing is performed in a state where the line of sight is directed to the right, a leftward arrow is preferably displayed at a rightward position.

Regarding Combination with First Example Embodiment

Figure 25:
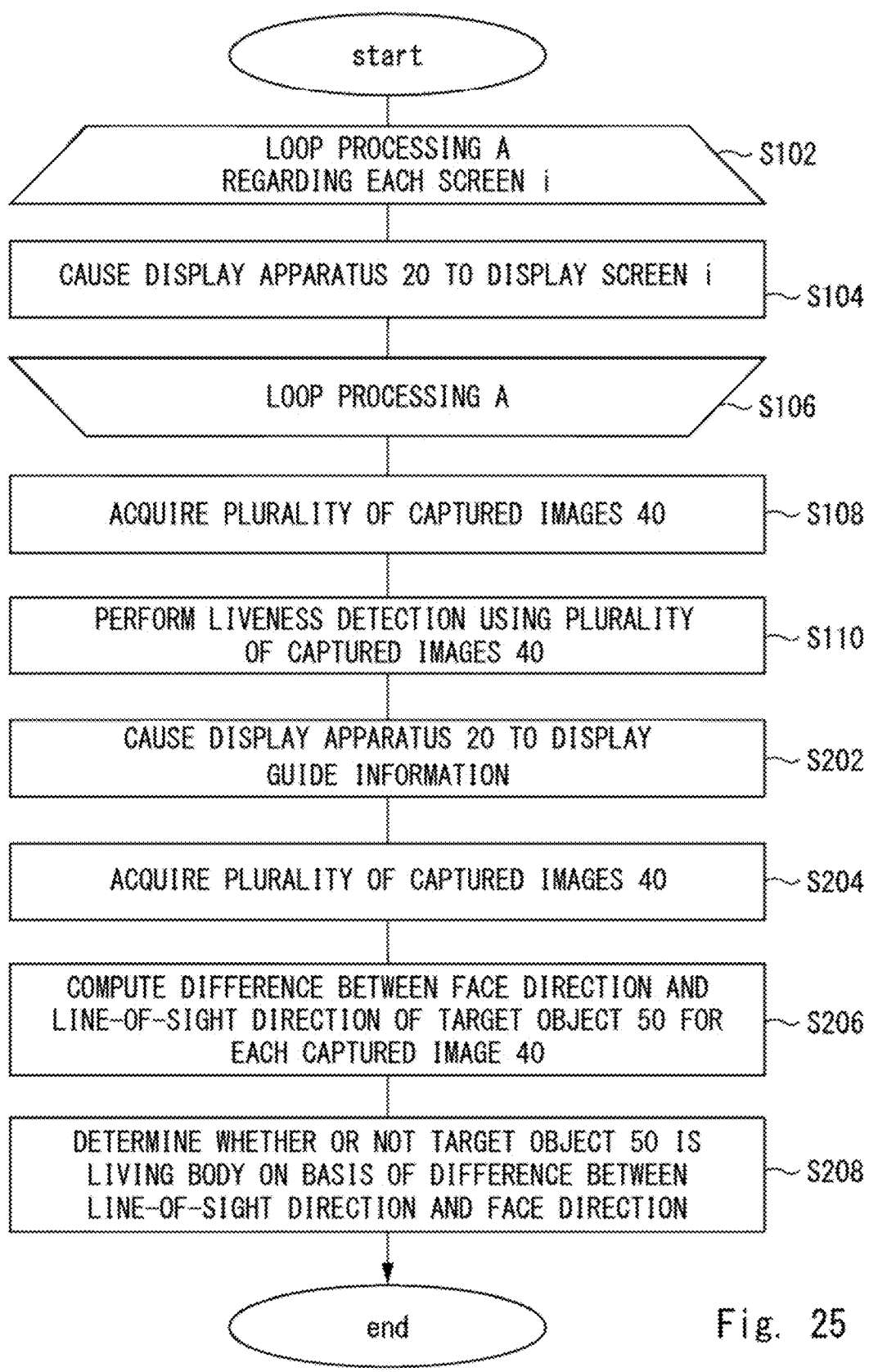
FIG. 25 is a flowchart illustrating a flow of processing in a case where the liveness detection by the liveness detection apparatus of the first example embodiment and the liveness detection by the liveness detection apparatus of the second example embodiment are sequentially performed.

The liveness detection apparatus 2000 of the first example embodiment and the liveness detection apparatus 2000 of the second example embodiment perform liveness detection by different methods. Therefore, it is preferable that both the liveness detection by the liveness detection apparatus 2000 of the first example embodiment and the liveness detection by the liveness detection apparatus 2000 of the second example embodiment (which may be the first modified example or the second modified example) be performed on the same target object 50. FIG. 25 is a flowchart illustrating a flow of processing in a case where the liveness detection by the liveness detection apparatus 2000 of the first example embodiment and the liveness detection by the liveness detection apparatus 2000 of the second example embodiment are sequentially performed. In the example of FIG. 25, after the liveness detection by the liveness detection apparatus 2000 of the first example embodiment (the series of processing illustrated in the flowchart of FIG. 4) is performed, the liveness detection by the liveness detection apparatus 2000 of the second example embodiment (the series of processing illustrated in the flowchart of FIG. 16) is performed. However, after the liveness detection is performed by the liveness detection apparatus 2000 of the second example embodiment, the liveness detection may be performed by the liveness detection apparatus 2000 of the first example embodiment.

For example, the liveness detection may be performed as a part of user authentication. For example, as one of methods of user authentication, there is a method of capturing the face of a user with a camera and comparing the face with faces registered in advance to determine whether or not the user is a registered user. At this time, in order to prevent another person from impersonating a registered user by using a photograph or the like of the registered user, it is preferable to confirm that the object captured by the camera is not a photograph or the like, but a living body. Hence, it is preferable to confirm that the target object 50 is a living body (that is, impersonation using a photograph, a 3D mask, or the like is not performed) by using the liveness detection apparatus 2000 in addition to confirming that the target object 50 is the registered user by comparing the image of the target object 50 and the image of the registered user. Note that either the processing of confirming that the target object 50 is a registered user or the processing of confirming that the target object 50 is a living body may be performed first, or may be performed in parallel.

<Method for Preventing Replacement of Target Object 50>

In a case where the liveness detection is performed by a plurality of methods, it is preferable to ensure that the processing is performed for the same target object 50 from the beginning to the end. For example, in a case where the liveness detection is performed by the liveness detection apparatus 2000 of the first example embodiment and then the liveness detection is performed by the liveness detection apparatus 2000 of the second example embodiment, the same target object 50 is set as a target of the liveness detection from the start of the liveness detection by the liveness detection apparatus 2000 of the first example embodiment to the completion of the liveness detection by the liveness detection apparatus 2000 of the second example embodiment. In this way, by replacing the target of the liveness detection for each type of the method for realizing the liveness detection, it is possible to prevent an impersonation means that is difficult to prevent by the method from being used.

For example, the liveness detection apparatus 2000 performs the processing described below. First, as a premise, the liveness detection apparatus 2000 executes two or more types of liveness detection processing. For example, it is assumed that liveness detection processing (hereinafter, first liveness detection processing) performed by the liveness detection apparatus 2000 of the first example embodiment and liveness detection processing (hereinafter, second liveness detection processing) performed by the liveness detection apparatus 2000 of the second example embodiment are performed. In this case, the liveness detection apparatus 2000 repeatedly determines whether or not the same target object 50 is continuously captured by the camera 10 in parallel with the processing for the liveness detection from the start of the first liveness detection processing (from the start of S102 in FIG. 25) to the completion of the second liveness detection processing (until S208 in FIG. 25 is completed). Then, in a case where it is determined that there is a possibility that the same target object 50 is not continuously captured by the camera 10, the liveness detection apparatus 2000 ends the liveness detection processing.

Whether or not the same target object 50 is continuously captured by the camera 10 can be determined, for example, by tracking the target object 50. Specifically, the liveness detection apparatus 2000 tracks the target object 50 by analyzing the captured images 40 generated by the camera 10 in time series. The liveness detection apparatus 2000 repeatedly determines whether or not the target object 50 is included in the captured image 40 based on the tracking. Then, in a case where the target object 50 is not included in the captured images 40 before the series of liveness detection processing is completed, the liveness detection apparatus 2000 determines that the same target object 50 is not continuously captured by the camera 10. On the other hand, while the target object 50 is continuously included in the captured images 40, it is determined that the same target object 50 is continuously captured by the camera 10. In the tracking, a region in the captured image 40 to be searched for detecting the target object 50 is limited to the vicinity of the previously detected region. Therefore, there is an advantage that a processing load required for detecting the target object 50 is smaller.

In another example, the liveness detection apparatus 2000 may register an image feature value of the target object 50 at the start of the liveness detection processing, and determine whether or not the target object 50 is continuously captured by the camera 10 by confirming that the image feature value is continuously included in the captured images 40. In this case, the liveness detection apparatus 2000 detects the target object 50 from the captured image 40 before the series of liveness detection processing is started (for example, before S102 in FIG. 25 is first started), and registers the image feature value of the target object 50 (puts the image feature value into the storage apparatus). The liveness detection apparatus 2000 detects the image feature value of the registered target object 50 from the captured image 40 obtained thereafter.

The processing of detecting the image feature value of the target object 50 from the captured image 40 may be performed on all the captured images 40 or may be performed on some of the captured images 40. In the latter case, for example, the liveness detection apparatus 2000 detects the image feature value of the target object 50 using the captured images 40 for each predetermined time (for each predetermined number). In another example, in response to satisfaction of a specific condition, the liveness detection apparatus 2000 detects the image feature value of the target object 50 using the captured image 40 obtained at that time. In the case of the liveness detection apparatus 2000 of the first example embodiment, the specific condition is, for example, that the screen 30 displayed on the display apparatus 20 is changed. Further, in the case of the liveness detection apparatus 2000 of the second example embodiment, the specific condition is, for example, any one or more of the following conditions: the face is directed to the front (the face direction becomes 0°), the face is directed to the left (the face direction becomes equal to or less than a negative threshold), the face is directed to the right (the face direction becomes equal to or greater than a positive threshold), and the face is moving.

In a case where the image feature value of the target object 50 is not detected from the captured images 40 before the series of liveness detection processing is completed, the liveness detection apparatus 2000 determines that the same target object 50 is not continuously captured by the camera 10. On the other hand, in a case where the image feature value of the target object 50 is continuously detected from the captured images 40 until the series of liveness detection processing is completed, it is determined that the same target object 50 is continuously captured by the camera 10. According to the method of detecting the image feature value of the target object 50 from the captured image 40, even when an object other than the target object 50 can be captured by the camera 10, it is possible to accurately determine whether or not the target object 50 is continuously captured by the camera 10.

In a case where it is determined that the same target object 50 is not continuously captured by the camera 10, it is preferable that the liveness detection apparatus 2000 take some measure. For example, the liveness detection apparatus 2000 performs the liveness detection of the target object 50 again from the beginning (for example, from S102 in FIG. 25). At this time, it is preferable to cause the display apparatus 20 to display a message such as "continue to capture your image with the camera 10", thereby causing the user to recognize that it is necessary to continue to capture the images with the camera 10. In another example, the liveness detection apparatus 2000 may cause the display apparatus 20 to display information indicating which of a plurality of types of liveness detection is performed when it is determined that the same target object 50 is not continuously captured by the camera 10.

Further, in a case where retry of the liveness detection processing occurs a predetermined number of times or more (it may be once), the liveness detection processing may not be performed any more. Further, processing of protecting the account of the user who is the target of the impersonation may be performed. For example, as described above, it is assumed that the liveness detection is performed as a part of the user authentication. In this case, for example, it is assumed that a person A tries to impersonate a registered user B. Specifically, it is assumed that the liveness detection apparatus 2000 performs the liveness detection, after it is determined that the person to be authenticated is the user B when the person A causes the camera 10 to capture a photograph of the user B. Then, it is assumed that the retry of the liveness detection occurs a predetermined number of times or more due to the above-described tracking of the target object 50 or the like. In this case, for example, the liveness detection apparatus 2000 protects the account of the user B by locking the account of the user B or transmitting a warning notification to the mobile terminal of the user B. This makes it possible to more appropriately prevent damage by impersonation.

Note that the liveness detection apparatus 2000 may perform processing similar to the processing performed in a case where the same target object 50 is not continuously captured in a case where a plurality of human faces is detected from the captured image 40.

Although the present invention has been described above with reference to the example embodiments, the present invention is not limited to the above-described example embodiments. Various changes that can be understood by those skilled in the art can be made to the configuration and details of the present invention within the scope of the present invention.

Note that, in the above-described examples, the program can be stored and provided to a computer using any type of non-transitory computer-readable media. Non-transitory computer readable media include any type of tangible storage media. Examples of the non-transitory computer readable media include a magnetic recording medium (for example, a flexible disk, a magnetic tape, or a hard disk drive), a magneto-optical recording medium (for example, a magneto-optical disk), a CD-ROM, a CD-R, a CD-R/W, and semiconductor memory (for example, mask ROM, programmable ROM (PROM), erasable PROM (EPROM), flash ROM, or RAM. Further, the program may be provided to a computer using any type of transitory computer readable media. Examples of the transitory computer readable media include electric signals, optical signals, and electromagnetic waves. The transitory computer readable media can provide the program to the computer via a wired communication line such as an electric wire and optical fibers or a wireless communication line.

Some or all of the above-described example embodiments may be described as the following supplement notes, but are not limited to the following.

(Supplementary Note 1)

A computer-readable medium storing a program executed by a computer, the program causing the computer to execute:
- a display control step of causing a display apparatus to display a first screen including a display in each of a plurality of regions and a second screen including a display different from the display of the first screen;
- an acquisition step of acquiring a plurality of captured images that are generated by capturing a target while each of the first screen and the second screen is displayed; and
- a liveness detection step of determining whether or not the target is a living body using a plurality of the captured images,
- wherein the first screen includes at least two regions having different displays.

(Supplementary Note 2)

The computer-readable medium according to Supplementary note 1, wherein at least two regions of the plurality of regions included in the first screen include: displays with different colors from each other; displays with different brightness from each other; or different characters, symbols, or figures from each other.

(Supplementary Note 3)

The computer-readable medium according to Supplementary note 1 or 2, wherein in the display control step, a boundary of the plurality of regions included in the first screen is determined based on a positional relationship between the display apparatus and a camera that generates the captured image.

(Supplementary Note 4)

The computer-readable medium according to Supplementary note 1 or 2, wherein a boundary of the plurality of regions included in the first screen is determined by user input.

(Supplementary Note 5)

The computer-readable medium according to any one of Supplementary notes 1 to 4,
- wherein the program includes an identification model that is trained to output a label indicating whether or not the target shown in the captured image is a living body in response to input of a plurality of the captured images, and
- wherein in the display control step, whether or not the target is a living body is determined by inputting a plurality of the captured images acquired in the acquisition step into the identification model and obtaining the label from the identification model.

(Supplementary Note 6)

The computer-readable medium according to Supplementary note 5,
- wherein the identification model is trained using both training data of a positive example and training data of a negative example, and
- wherein the training data of the positive example includes: a plurality of captured images obtained by capturing an image of a face of a real person while each of the first screen and the second screen is displayed; and data indicating that a captured target is a living body, and
- wherein the training data of the negative example includes: a plurality of captured images obtained by capturing an image of a face of a person while each of the first screen and the second screen is displayed; and data indicating that a captured target is not a living body.

(Supplementary Note 7)

The computer-readable medium according to any one of Supplementary notes 1 to 6, wherein in the display control step, intensity of ambient light around the display apparatus is determined, and the first screen and the second screen are displayed on the display apparatus when the intensity of the ambient light is equal to or less than a threshold.

(Supplementary Note 8)

The computer-readable medium according to Supplementary note 7, wherein in the display control step, when the intensity of the ambient light is greater than the threshold, a message prompting to move to a location where the ambient light is weaker than a current intensity is output.

(Supplementary Note 9)

The computer-readable medium according to any one of Supplementary notes 1 to 8, wherein in the display control step, intensity of ambient light around the display apparatus is determined, and a display to be included in at least one of the first screen and the second screen is determined according to the intensity of the ambient light.

(Supplementary Note 10)

The computer-readable medium according to any one of Supplementary notes 1 to 9, executing:
- a second display control step of causing the display apparatus to display a guide related to a direction of a line of sight and a guide related to a face direction;
- a second acquisition step of acquiring a captured image generated by capturing the target with the camera a plurality of times; and
- a second liveness detection step of computing a difference between the face direction and a line-of-sight direction for each of the captured images by using an image of a face of the target shown in each of the captured images, and determining whether or not the target is a living body based on the computed difference,
- wherein in the second display control step, the display apparatus is caused to display a guide prompting to swing the face left and right while a same place is continuously viewed.

(Supplementary Note 11)

The computer-readable medium according to Supplementary note 10, wherein in the second display control step:
- a guide prompting to direct the face in a first direction without moving the line of sight is displayed on the display apparatus;
- whether or not a face direction of the target is the first direction is determined; and
- when the face direction of the target is the first direction, the display apparatus is caused to display a guide prompting to direct the face in a second direction without moving the line of sight.

(Supplementary Note 12)

The computer-readable medium according to Supplementary note 10 or 11, wherein in the second display control step, it is determined whether or not a magnitude of a face swing width of the target is equal to or greater than a threshold, and when the magnitude of the face swing width is not equal to or greater than the threshold, the display apparatus is caused to display a guide prompting to swing the face more largely.

(Supplementary Note 13)

The computer-readable medium according to any one of Supplementary notes 10 to 12, wherein in the second display control step, it is determined whether or not speed of movement of the face of the target is equal to or greater than a threshold, and the display apparatus is caused to display a guide prompting to move the face more slowly when the speed of movement of the face is equal to or less than the threshold.

(Supplementary Note 14)

The computer-readable medium according to any one of Supplementary notes 10 to 13, wherein in the second display control step, it is determined whether or not the line-of-sight direction of the target is fixed, and the display apparatus is caused to display a guide prompting not to move the line-of-sight direction when the line-of-sight direction is not fixed.

(Supplementary Note 15)

The computer-readable medium according to any one of Supplementary notes 10 to 14, wherein in the second display control step, the display apparatus is caused to display one or more of a display indicating a face direction of the target, a display indicating a direction in which the target should direct the face, a display indicating the line-of-sight direction of the target, and a display indicating a direction in which the target should direct the line of sight.

(Supplementary Note 16)

The computer-readable medium according to any one of Supplementary notes 10 to 15, wherein it is determined whether or not a same target is continuously captured by the camera by using captured images that are generated by the camera during time from a start of displaying a screen in the display control step until liveness detection is performed in the second liveness detection step, and
- wherein processing is performed again from the display control step in a case where the same target is not continuously captured.

(Supplementary Note 17)

The computer-readable medium according to Supplementary note 16,
- wherein it is determined whether or not the target is shown in each of the captured images by tracking the target, and
- wherein in a case where the captured image in which the target is not shown is detected, it is determined that the same target is not continuously captured.

(Supplementary Note 18)

The computer-readable medium according to Supplementary note 16,
- wherein an image feature value of the target is detected from each of the captured images, and
- wherein when the captured image not including the image feature value of the target is detected, it is determined that the same target is not continuously captured.

(Supplementary Note 19)

A liveness detection apparatus comprising:
a display control unit configured to cause a display apparatus to display a first screen including a display in each of a plurality of regions and a second screen including a display different from the display of the first screen;
an acquisition unit configured to acquire a plurality of captured images that are generated by capturing a target while each of the first screen and the second screen is displayed; and
a liveness detection unit configured to determine whether or not the target is a living body using a plurality of the captured images,
wherein the first screen includes at least two regions having different displays.

(Supplementary Note 20)

The liveness detection apparatus according to Supplementary note 19, wherein at least two regions of the plurality of regions included in the first screen include: displays with different colors from each other; displays with different brightness from each other; or different characters, symbols, or figures from each other.

(Supplementary Note 21)

The liveness detection apparatus according to Supplementary note 19 or 20, wherein the display control unit determines a boundary of the plurality of regions included in the first screen based on a positional relationship between the display apparatus and a camera that generates the captured image.

(Supplementary Note 22)

The liveness detection apparatus according to Supplementary note 19 or 20, wherein a boundary of the plurality of regions included in the first screen is determined by user input.

(Supplementary Note 23)

The liveness detection apparatus according to any one of Supplementary notes 19 to 22, comprising an identification model that is trained to output a label indicating whether or not the target shown in the captured image is a living body in response to input of a plurality of the captured images,
wherein the display control unit determines whether or not the target is a living body by inputting a plurality of the captured images acquired in the acquisition step into the identification model and obtaining the label from the identification model.

(Supplementary Note 24)

The liveness detection apparatus according to Supplementary note 23,
wherein the identification model is trained using both training data of a positive example and training data of a negative example, and
wherein the training data of the positive example includes: a plurality of captured images obtained by capturing an image of a face of a real person while each of the first screen and the second screen is displayed; and data indicating that a captured target is a living body, and
wherein the training data of the negative example includes: a plurality of captured images obtained by capturing an image of a face of a person while each of the first screen and the second screen is displayed; and data indicating that a captured target is not a living body.

(Supplementary Note 25)

The liveness detection apparatus according to any one of Supplementary notes 19 to 24, wherein the display control unit determines intensity of ambient light around the display apparatus, and displays the first screen and the second screen on the display apparatus when the intensity of the ambient light is equal to or less than a threshold.

(Supplementary Note 26)

The liveness detection apparatus according to Supplementary note 25, wherein the display control unit outputs, when the intensity of the ambient light is greater than the threshold, a message prompting to move to a location where the ambient light is weaker than a current intensity.

(Supplementary Note 27)

The liveness detection apparatus according to any one of Supplementary notes 19 to 26, wherein the display control unit determines intensity of ambient light around the display apparatus, and determines a display to be included in at least one of the first screen and the second screen according to the intensity of the ambient light.

(Supplementary Note 28)

The liveness detection apparatus according to any one of Supplementary notes 19 to 27, executing:
a second display control unit configured to cause the display apparatus to display a guide related to a direction of a line of sight and a guide related to a face direction;
a second acquisition unit configured to acquire a captured image generated by capturing the target with the camera a plurality of times; and
a second liveness detection unit configured to compute a difference between the face direction and a line-of-sight direction for each of the captured images by using an image of a face of the target shown in each of the captured images, and determining whether or not the target is a living body based on the computed difference,
wherein the second display control unit causes the display apparatus to display a guide prompting to swing the face left and right while a same place is continuously viewed.

(Supplementary Note 29)

The liveness detection apparatus according to Supplementary note 28, wherein the second display control unit performs:
displaying a guide prompting to direct the face in a first direction without moving the line of sight on the display apparatus;
determining whether or not a face direction of the target is the first direction; and
when the face direction of the target is the first direction, causing the display apparatus to display a guide prompting to direct the face in a second direction without moving the line of sight.

(Supplementary Note 30)

The liveness detection apparatus according to Supplementary note 28 or 29, wherein the second display control unit determines whether or not a magnitude of a face swing width of the target is equal to or greater than a threshold, and when the magnitude of the face swing width is not equal to or greater than the threshold, causes the display apparatus to display a guide prompting to swing the face more largely.

(Supplementary Note 31)

The liveness detection apparatus according to any one of Supplementary notes 28 to 30, wherein second display control unit determines whether or not speed of movement of the face of the target is equal to or greater than a threshold, and causes the display apparatus to display a guide prompting to move the face more slowly when the speed of movement of the face is equal to or less than the threshold.

(Supplementary Note 32)

The liveness detection apparatus according to any one of Supplementary notes 28 to 31, wherein the second display control unit determines whether or not the line-of-sight direction of the target is fixed, and causes the display apparatus to display a guide prompting not to move the line-of-sight direction when the line-of-sight direction is not fixed.

(Supplementary Note 33)

The liveness detection apparatus according to any one of Supplementary notes 28 to 32, wherein the second display control unit causes the display apparatus to display one or more of a display indicating a face direction of the target, a display indicating a direction in which the target should direct the face, a display indicating the line-of-sight direction of the target, and a display indicating a direction in which the target should direct the line of sight.

(Supplementary Note 34)

The liveness detection apparatus according to any one of Supplementary notes 28 to 33, wherein it is determined whether or not a same target is continuously captured by the camera by using captured images that are generated by the camera during time from a start of displaying a screen in the display control step until liveness detection is performed in the second liveness detection step, and
   wherein processing is performed again from the display control unit in a case where the same target is not continuously captured.

(Supplementary Note 35)

The liveness detection apparatus according to Supplementary note 34,
   wherein it is determined whether or not the target is shown in each of the captured images by tracking the target, and
   wherein in a case where the captured image in which the target is not shown is detected, it is determined that the same target is not continuously captured.

(Supplementary Note 36)

The liveness detection apparatus according to Supplementary note 34,
   wherein an image feature value of the target is detected from each of the captured images, and
   wherein when the captured image not including the image feature value of the target is detected, it is determined that the same target is not continuously captured.

(Supplementary Note 37)

A control method to be executed by a computer, comprising:
   a display control step of causing a display apparatus to display a first screen including a display in each of a plurality of regions and a second screen including a display different from the display of the first screen;
   an acquisition step of acquiring a plurality of captured images that are generated by capturing a target while each of the first screen and the second screen is displayed; and
   a liveness detection step of determining whether or not the target is a living body using a plurality of the captured images,
   wherein the first screen includes at least two regions having different displays.

(Supplementary Note 38)

The control method according to Supplementary note 37, wherein at least two regions of the plurality of regions included in the first screen include: displays with different colors from each other; displays with different brightness from each other; or different characters, symbols, or figures from each other.

(Supplementary Note 39)

The control method according to Supplementary note 37 or 38, wherein in the display control step, a boundary of the plurality of regions included in the first screen is determined based on a positional relationship between the display apparatus and a camera that generates the captured image.

(Supplementary Note 40)

The control method according to Supplementary note 37 or 38, wherein a boundary of the plurality of regions included in the first screen is determined by user input.

(Supplementary Note 41)

The control method according to any one of Supplementary notes 37 to 40,
   wherein the computer includes an identification model that is trained to output a label indicating whether or not the target shown in the captured image is a living body in response to input of a plurality of the captured images, and
   wherein in the display control step, whether or not the target is a living body is determined by inputting a plurality of the captured images acquired in the acquisition step into the identification model and obtaining the label from the identification model.

(Supplementary Note 42)

The control method according to Supplementary note 41,
   wherein the identification model is trained using both training data of a positive example and training data of a negative example, and
   wherein the training data of the positive example includes: a plurality of captured images obtained by capturing an image of a face of a real person while each of the first screen and the second screen is displayed; and data indicating that a captured target is a living body, and
   wherein the training data of the negative example includes: a plurality of captured images obtained by capturing an image of a face of a person while each of the first screen and the second screen is displayed; and data indicating that a captured target is not a living body.

(Supplementary Note 43)

The control method according to any one of Supplementary notes 37 to 42, wherein in the display control step, intensity of ambient light around the display apparatus is determined, and the first screen and the second screen are displayed on the display apparatus when the intensity of the ambient light is equal to or less than a threshold.

(Supplementary Note 44)

The control method according to Supplementary note 43, wherein in the display control step, when the intensity of the ambient light is greater than the threshold, a message prompting to move to a location where the ambient light is weaker than a current intensity is output.

(Supplementary Note 45)

The control method according to any one of Supplementary notes 37 to 44, wherein in the display control step, intensity of ambient light around the display apparatus is determined, and a display to be included in at least one of the first screen and the second screen is determined according to the intensity of the ambient light.

(Supplementary Note 46)

The control method according to any one of Supplementary notes 37 to 45, comprising:
- a second display control step of causing the display apparatus to display a guide related to a direction of a line of sight and a guide related to a face direction;
- a second acquisition step of acquiring a captured image generated by capturing the target with the camera a plurality of times; and
- a second liveness detection step of computing a difference between the face direction and a line-of-sight direction for each of the captured images by using an image of a face of the target shown in each of the captured images, and determining whether or not the target is a living body based on the computed difference,
- wherein in the second display control step, the display apparatus is caused to display a guide prompting to swing the face left and right while a same place is continuously viewed.

(Supplementary Note 47)

The control method according to Supplementary note 46, wherein in the second display control step:
- a guide prompting to direct the face in a first direction without moving the line of sight is displayed on the display apparatus;
- whether or not a face direction of the target is the first direction is determined; and
- when the face direction of the target is the first direction, the display apparatus is caused to display a guide prompting to direct the face in a second direction without moving the line of sight.

(Supplementary Note 48)

The control method according to Supplementary note 46 or 47, wherein in the second display control step, it is determined whether or not a magnitude of a face swing width of the target is equal to or greater than a threshold, and when the magnitude of the face swing width is not equal to or greater than the threshold, the display apparatus is caused to display a guide prompting to swing the face more largely.

(Supplementary Note 49)

The control method according to any one of Supplementary notes 46 to 48, wherein in the second display control step, it is determined whether or not speed of movement of the face of the target is equal to or greater than a threshold, and the display apparatus is caused to display a guide prompting to move the face more slowly when the speed of movement of the face is equal to or less than the threshold.

(Supplementary Note 50)

The control method according to any one of Supplementary notes 46 to 49, wherein in the second display control step, it is determined whether or not the line-of-sight direction of the target is fixed, and the display apparatus is caused to display a guide prompting not to move the line-of-sight direction when the line-of-sight direction is not fixed.

(Supplementary Note 51)

The control method according to any one of Supplementary notes 46 to 50, wherein in the second display control step, the display apparatus is caused to display one or more of a display indicating a face direction of the target, a display indicating a direction in which the target should direct the face, a display indicating the line-of-sight direction of the target, and a display indicating a direction in which the target should direct the line of sight.

(Supplementary Note 52)

The control method according to any one of Supplementary notes 46 to 51, wherein it is determined whether or not a same target is continuously captured by the camera by using captured images that are generated by the camera during time from a start of displaying a screen in the display control step until liveness detection is performed in the second liveness detection step, and
wherein processing is performed again from the display control step in a case where the same target is not continuously captured.

(Supplementary Note 53)

The control method according to Supplementary note 52, wherein it is determined whether or not the target is shown in each of the captured images by tracking the target, and
wherein in a case where the captured image in which the target is not shown is detected, it is determined that the same target is not continuously captured.

(Supplementary Note 54)

The control method according to Supplementary note 52, wherein an image feature value of the target is detected from each of the captured images, and
wherein when the captured image not including the image feature value of the target is detected, it is determined that the same target is not continuously captured.

REFERENCE SIGNS LIST

10 CAMERA
20 DISPLAY APPARATUS
30 SCREEN
32 REGION
34 BOUNDARY LINE
40 CAPTURED IMAGE
50 TARGET OBJECT
60 TERMINAL
80, 90, 100, 110 SCREEN
500 COMPUTER
502 BUS
504 PROCESSOR
506 MEMORY
508 STORAGE DEVICE
510 INPUT/OUTPUT INTERFACE
512 NETWORK INTERFACE
2000 LIVENESS DETECTION APPARATUS
2020 DISPLAY CONTROL UNIT
2040 ACQUISITION UNIT
2060 LIVENESS DETECTION UNIT
2080 SECOND DISPLAY CONTROL UNIT
2100 SECOND ACQUISITION UNIT
2120 SECOND LIVENESS DETECTION UNIT

What is claimed is:

1. A non-transitory computer-readable medium storing a program that causes a computer to execute:
- causing a display apparatus to display a first screen including a display in each of a plurality of regions and a second screen including a display different from the display of the first screen;
- acquiring a plurality of captured images that are generated by capturing a target by a camera while each of the first screen and the second screen is displayed; and
- determining whether or not the target is a living body using one or more of the plurality of captured images,
- wherein the first screen includes at least two regions having different displays,
- wherein the camera is positioned facing the target such that the camera captures the target that is irradiated with light output from the display apparatus,
- wherein at least two regions of the plurality of regions included in the first screen include: displays with different colors from each other; displays with different brightness from each other; or displays with different characters, symbols, or figures from each other, and wherein the program causes the computer to further execute determining a boundary of the plurality of regions included in the first screen based on a positional relationship between the display apparatus and the camera that generates the plurality of captured images.

2. The non-transitory computer-readable medium according to claim 1, wherein the program includes an identification model that is trained to output a label indicating whether or not the target shown in the plurality of captured images is a living body in response to input of one or more of the plurality of captured images, and wherein the program causes the computer to further execute determining whether or not the target is a living body by inputting one or more of the plurality of captured images into the identification model and obtaining the label from the identification model.

3. The non-transitory computer-readable medium according to claim 2, wherein the identification model is trained using both training data of a positive example and training data of a negative example, and wherein the training data of the positive example includes: a plurality of captured images obtained by capturing an image of a face of a real person while each of the first screen and the second screen is displayed; and data indicating that a captured target is a living body, and wherein the training data of the negative example includes: a plurality of captured images obtained by capturing an image of a face of a person while each of the first screen and the second screen is displayed; and data indicating that a captured target is not a living body.

4. The non-transitory computer-readable medium according to claim 1, wherein the program causes the computer to further execute: determining intensity of ambient light around the display apparatus; and displaying the first screen and the second screen on the display apparatus when the intensity of the ambient light is equal to or less than a threshold.

5. The non-transitory computer-readable medium according to claim 4, wherein the program causes the computer to further execute, when the intensity of the ambient light is greater than the threshold, outputting a message prompting to move to a location where the ambient light is weaker than a current intensity.

6. The non-transitory computer-readable medium according to claim 1, wherein the program causes the computer to further execute: determining intensity of ambient light around the display apparatus; and determining a display to be included in at least one of the first screen and the second screen according to the intensity of the ambient light.

7. The non-transitory computer-readable medium according to claim 1, wherein the program causes the computer to further execute:

causing the display apparatus to display a guide related to a direction of a line of sight and a guide related to a face direction;

acquiring the plurality of captured images by capturing the target with the camera a plurality of times; and computing a difference between the face direction and a line-of-sight direction for each of the plurality of captured images by using an image of a face of the target shown in each of the plurality of captured images, and determining whether or not the target is a living body based on the computed difference, and wherein the display of a guide includes causing the display apparatus to display a guide prompting to swing the face left and right while a same place is continuously viewed.

8. The non-transitory computer-readable medium according to claim 7, wherein the program causes the computer to further execute:

displaying a guide prompting to direct the face in a first direction without moving the line of sight on the display apparatus;

determining whether or not a face direction of the target is the first direction; and causing, when the face direction of the target is the first direction, the display apparatus to display a guide prompting to direct the face in a second direction without moving the line of sight.

9. The non-transitory computer-readable medium according to claim 7, wherein the program causes the computer to further execute: determining whether or not a magnitude of a face swing width of the target is equal to or greater than a threshold; and when the magnitude of the face swing width is not equal to or greater than the threshold, the display apparatus to display a guide prompting to swing the face more largely.

10. The non-transitory computer-readable medium according to claim 7, wherein the program causes the computer to further execute: determining whether or not speed of movement of the face of the target is equal to or greater than a threshold; and causing the display apparatus to display a guide prompting to move the face more slowly when the speed of movement of the face is equal to or less than the threshold.

11. The non-transitory computer-readable medium according to claim 7, wherein the program causes the computer to further execute: determining whether or not the line-of-sight direction of the target is fixed; and causing the display apparatus to display a guide prompting not to move the line-of-sight direction when the line-of-sight direction is not fixed.

12. The non-transitory computer-readable medium according to claim 7, wherein the program causes the computer to further execute causing the display apparatus to display one or more of a display indicating a face direction of the target, a display indicating a direction in which the target should direct the face, a display indicating the line-of-sight direction of the target, and a display indicating a direction in which the target should direct the line of sight.

13. The non-transitory computer-readable medium according to claim 7, wherein it is determined whether or not a same target is continuously captured by the camera by using captured images that are generated by the camera during time from a start of displaying a screen until liveness detection is performed, and wherein processing is performed again from the causing the display apparatus to display the first screen and the second screen in a case where the same target is not continuously captured.

14. The non-transitory computer-readable medium according to claim 13, wherein it is determined whether or not the target is shown in each of the plurality of captured images by tracking the target, and wherein in a case where a captured image, among the plurality of captured images, in which the target is not shown is detected, it is determined that the same target is not continuously captured.

15. The non-transitory computer-readable medium according to claim 13,
wherein an image feature value of the target is detected from each of the plurality of captured images, and
wherein when a captured image, among the plurality of captured images, that does not include the image feature value of the target is detected, it is determined that the same target is not continuously captured.

16. A liveness detection apparatus comprising:
at least one memory storing instructions; and
at least one processor that is configured to execute the instructions to:
  cause a display apparatus to display a first screen including a display in each of a plurality of regions and a second screen including a display different from the display of the first screen;
  acquire a plurality of captured images that are generated by capturing a target by a camera while each of the first screen and the second screen is displayed; and
  determine whether or not the target is a living body using one or more of the plurality of captured images,
wherein the first screen includes at least two regions having different displays,
wherein the camera is positioned facing the target such that the camera captures the target that is irradiated with light output from the display apparatus,
wherein at least two regions of the plurality of regions included in the first screen include: displays with different colors from each other; displays with different brightness from each other; or displays with different characters, symbols, or figures from each other, and
wherein the at least one processor is configured to execute the instructions further to determine a boundary of the plurality of regions included in the first screen based on a positional relationship between the display apparatus and the camera that generates the plurality of captured images.

17. A control method to be executed by a computer, the control method comprising:
causing a display apparatus to display a first screen including a display in each of a plurality of regions and a second screen including a display different from the display of the first screen;
acquiring a plurality of captured images that are generated by capturing a target by a camera while each of the first screen and the second screen is displayed; and
determining whether or not the target is a living body using one or more of the plurality of captured images,
wherein the first screen includes at least two regions having different displays,
wherein the camera is positioned facing the target such that the camera captures the target that is irradiated with light output from the display apparatus,
wherein at least two regions of the plurality of regions included in the first screen include: displays with different colors from each other; displays with different brightness from each other; or displays with different characters, symbols, or figures from each other, and
wherein the control method further includes determining a boundary of the plurality of regions included in the first screen based on a positional relationship between the display apparatus and the camera that generates the plurality of captured images.

* * * * *